(12) United States Patent
Beernink et al.

(10) Patent No.: US 12,544,435 B2
(45) Date of Patent: Feb. 10, 2026

(54) NEISSERIAL SURFACE PROTEIN A (NSPA) VARIANTS AND METHODS OF USE THEREOF

(71) Applicant: THE REGENTS OF THE UNIVERSITY OF CALIFORNIA, Oakland, CA (US)

(72) Inventors: Peter T. Beernink, Walnut Creek, CA (US); Dhaarini Raghunathan, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 384 days.

(21) Appl. No.: 18/040,134

(22) PCT Filed: Aug. 6, 2021

(86) PCT No.: PCT/US2021/044950
§ 371 (c)(1),
(2) Date: Jan. 31, 2023

(87) PCT Pub. No.: WO2022/032099
PCT Pub. Date: Feb. 10, 2022

(65) Prior Publication Data
US 2024/0024450 A1   Jan. 25, 2024

Related U.S. Application Data

(60) Provisional application No. 63/062,181, filed on Aug. 6, 2020.

(51) Int. Cl.
  A61K 39/095   (2006.01)
  A61K 39/00    (2006.01)
  A61P 37/04    (2006.01)

(52) U.S. Cl.
  CPC ............ *A61K 39/095* (2013.01); *A61P 37/04* (2018.01); *A61K 2039/55505* (2013.01)

(58) Field of Classification Search
  None
  See application file for complete search history.

(56) References Cited

U.S. PATENT DOCUMENTS 6,287,574 B1   9/2001   Brodeur et al.

FOREIGN PATENT DOCUMENTS

WO   WO-2004019976 A2 *   3/2004   ........... A61K 39/095
WO   WO2014016152          1/2014

\* cited by examiner

*Primary Examiner* — Oluwatosin A Ogunbiyi
(74) *Attorney, Agent, or Firm* — Shweta Chandra; Bozicevic, Field & Francis LLP

(57) ABSTRACT

Variant Neisserial surface protein A (NspA) with reduced binding to human factor H (FH) are provided. These variants are useful for eliciting antibodies that are bactericidal for at least one strain of *N. meningitidis*. Compositions comprising such proteins, and methods of use of such proteins are disclosed.

21 Claims, 8 Drawing Sheets
Specification includes a Sequence Listing.

```
  1   2   3   4   5   6   7   8   9  10  11  12  13  14  15  16  17  18  19  20
  M   K   K   A   L   A   T   L   I   A   L   A   L   P   A   A   A   L   A   E 21  22  23  24  25  26  27  28  29  30  31  32  33  34  35  36  37  38  39  40
  G   A   S   G   F   Y   V   Q   A   D   A   A   H   A   K   A   S   S   S   L 41  42  43  44  45  46  47  48  49  50  51  52  53  54  55  56  57  58  59  60
  G   S   A   K   G   F   S   P   R   I   S   A   G   Y   R   I   N   D   L   R 61  62  63  64  65  66  67  68  69  70  71  72  73  74  75  76  77  78  79  80
  F   A   V   D   Y   T   R   Y   K   N   Y   K   A   P   S   T   D   F   K   L 81  82  83  84  85  86  87  88  89  90  91  92  93  94  95  96  97  98  99 100
  Y   S   I   G   A   S   A   I   Y   D   F   D   T   Q   S   P   V   K   P   Y 101 102 103 104 105 106 107 108 109 110 111 112 113 114 115 116 117 118 119 120
  L   G   A   R   L   S   L   N   R   A   S   V   D   L   G   G   S   D   S   F 121 122 123 124 125 126 127 128 129 130 131 132 133 134 135 136 137 138 139 140
  S   Q   T   S   T   G   L   G   V   L   A   G   V   S   Y   A   V   T   P   N 141 142 143 144 145 146 147 148 149 150 151 152 153 154 155 156 157 158 159 160
  V   D   L   D   A   G   Y   R   Y   N   Y   I   G   K   V   N   T   V   K   N 161 162 163 164 165 166 167 168 169 170 171 172 173 174
  V   R   S   G   E   L   S   A   G   V   R   V   K   F       (SEQ ID NO:1)
```

NEISSERIAL SURFACE PROTEIN A (NSPA) VARIANTS AND METHODS OF USE THEREOF

CROSS-REFERENCE TO RELATED APPLICATIONS

This application claims the benefit of U.S. Provisional Application No. 63/062,181, filed Aug. 6, 2020, which application is incorporated herein by reference in its entirety.

STATEMENT REGARDING FEDERALLY SPONSORED RESEARCH

This invention was made with government support under grant R01 AI134868 awarded by the National Institutes of Health. The government has certain rights in the invention.

INCORPORATION BY REFERENCE OF A SEQUENCE LISTING PROVIDED AS A TEXT FILE

A Sequence Listing is provided herewith as a text file, "CHOR-085WO Seq List_ST25.txt," created on Aug. 6, 2021 and having a size of 13 KB. The contents of the text file are incorporated by reference herein in their entirety.

INTRODUCTION

*Neisseria meningitidis* is a Gram-negative bacterium that colonizes the human upper respiratory tract and is responsible for worldwide sporadic and cyclical epidemic outbreaks of, most notably, meningitis and sepsis. The attack and morbidity rates are highest in children under 2 years of age. Like other Gram-negative bacteria, *N. meningitidis* typically possess a cytoplasmic membrane, a peptidoglycan layer, an outer membrane, which together with the capsular polysaccharide constitute the bacterial wall, and pili, which project into the outside environment. Encapsulated strains of *N. meningitidis* are a major cause of bacterial meningitis and septicemia in children and young adults. The prevalence and economic importance of invasive *N. meningitidis* infections has driven the search for effective vaccines that can confer immunity across different strains, and particularly across genetically diverse serogroup B strains with different serotypes or serosubtypes.

Neisserial surface protein A (NspA) is a *N. meningitidis* protein that is expressed in the bacterium as a surface-exposed outer membrane protein. NspA has been shown to bind human complement factor H (FH), which down-regulates complement activation. Binding of FH to the bacterial surface is an important mechanism by which the pathogen survives in non-immune human serum or blood and evades innate host defenses. Binding of FH to NspA is specific for human FH.

There remains a need for a NspA polypeptide that has reduced binding to FH and can elicit effective bactericidal antibody responses.

SUMMARY

Variant NspA that have reduced binding to FH and can elicit antibodies that are bactericidal for at least one strain of *N. meningitidis*, compositions comprising such proteins, and methods of use of such proteins, are provided.

BRIEF DESCRIPTION OF THE DRAWINGS

FIG. 1 depicts amino acid sequence of NspA protein from *N. meningitidis* serogroup W strain Sudan 1/06 (Su 1/06) (SEQ ID NO:1).

DEFINITIONS

Figure 2:
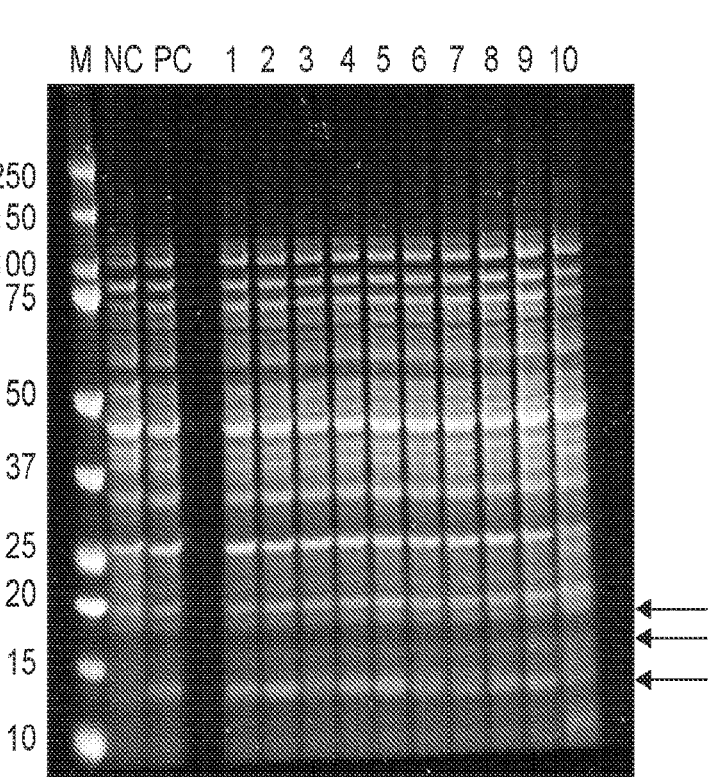
FIG. 2. SDS-PAGE and western blot analysis of site-directed mutants (SDMs) of NspA protein expressed in *E. coli* BL21(DE3).
Figure 2:
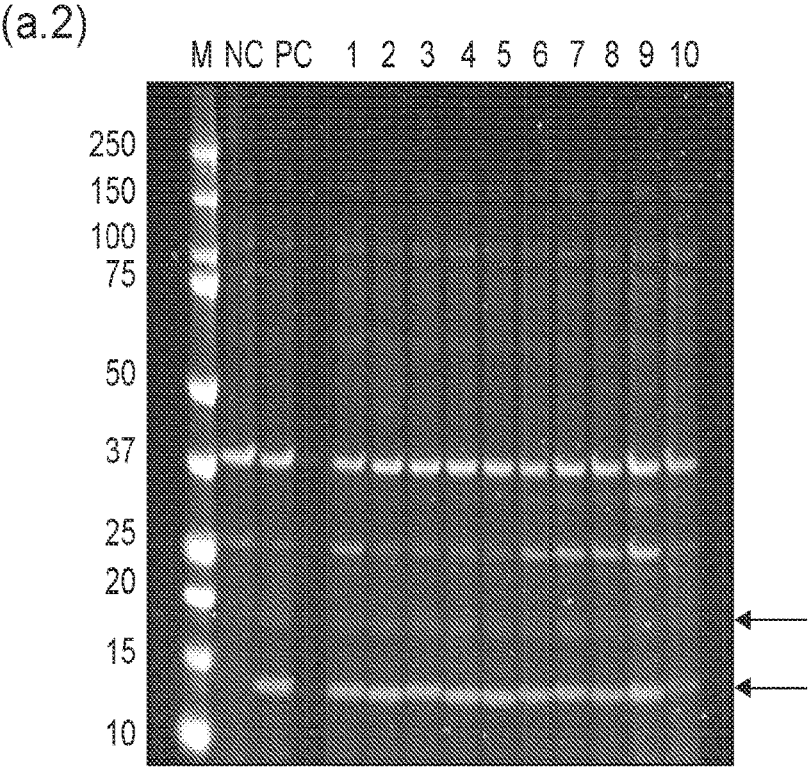
Figure 2:
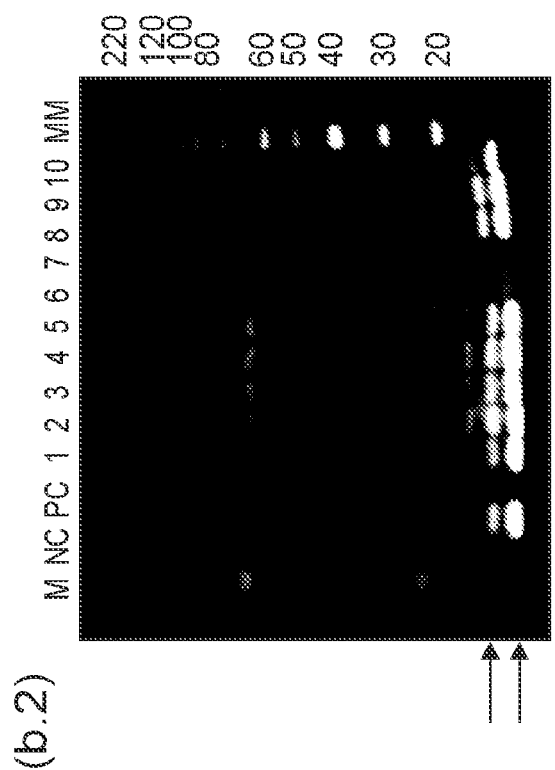
Figure 2:
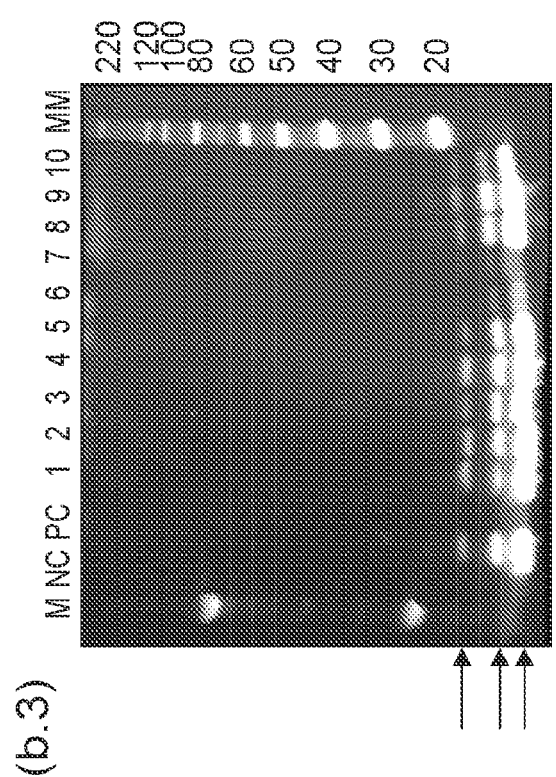
Figure 2:
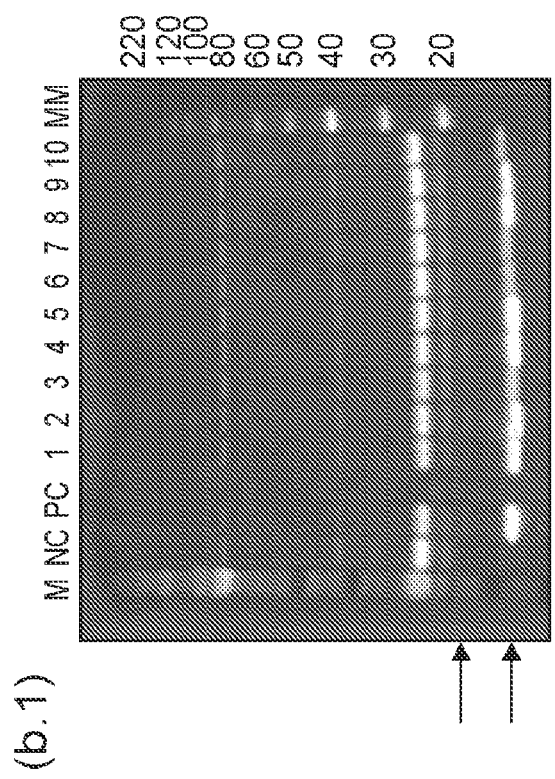

"NspA" as used herein refers to a naturally occurring NspA expressed by *Neisseria* bacteria, such as, *N. meningitidis* strains that cause life-threating disease. Such *N. meningitidis* strains include those of serogroups A, B, C, W, X, and Y.

Human factor H ("human FH") as used herein, refers to a protein comprising an amino acid sequence as shown in SEQ ID NO:2, and naturally-occurring human allelic variants thereof. SEQ ID NO:2:

```
                                            (SEQ ID NO: 2)
MRLLAKIICLMLWAICVAEDCNELPPRRNTEILTGSWSDQT

YPEGTQAIYKCRPGYRSLGNVIMVCRKGEWVALNPLRKCQ

KRPCGHPGDTPFGTFTLTGGNVFEYGVKAVYTCNEGYQLL

GEINYRECDTDGWTNDIPICEVVKCLPVTAPENGKIVSSA

MEPDREYHFGQAVRFVCNSGYKIEGDEEMHCSDDGFWSKE

KPKCVEISCKSPDVINGSPISQKIIYKENERFQYKCNMGY

EYSERGDAVCTESGWRPLPSCEEKSCDNPYIPNGDYSPLR

IKHRTGDEITYQCRNGFYPATRGNTAKCTSTGWIPAPRCT

LKPCDYPDIKHGGLYHENMRRPYFPVAVGKYYSYYCDEHF

ETPSGSYWDHIHCTQDGWSPAVPCLRKCYFPYLENGYNQN

YGRKFVQGKSIDVACHPGYALPKAQTTVTCMENGWSPTPR

CIRVKTCSKSSIDIENGFISESQYTYALKEKAKYQCKLGY

VTADGETSGSITCGKDGWSAQPTCIKSCDIPVFMNARTKN

DFTWFKLNDTLDYECHDGYESNTGSTTGSIVCGYNGWSDL

PICYERECELPKIDVHLVPDRKKDQYKVGEVLKFSCKPGF

TIVGPNSVQCYHFGLSPDLPICKEQVQSCGPPPELLNGNV

KEKTKEEYGHSEVVEYYCNPRFLMKGPNKIQCVDGEWTTL

PVCIVEESTCGDIPELEHGWAQLSSPPYYYGDSVEFNCSE

SFTMIGHRSITCIHGVWTQLPQCVAIDKLKKCKSSNLIIL

EEHLKNKKEFDHNSNIRYRCRGKEGWIHTVCINGRWDPEV

NCSMAQIQLCPPPPQIPNSHNMTTTLNYRDGEKVSVLCQE
```

-continued

NYLIQEGEEITCKDGRWQSIPLCVEKIPCSQPPQIEHGTI

NSSRSSQESYAHGTKLSYTCEGGFRISEENETTCYMGKWS

SPPQCEGLPCKSPPEISHGVVAHMSDSYQYGEEVTYKCFE

GFGIDGPAIAKCLGEKWSHPPSCIKTDCLSLPSFENAIPM

GEKKDVYKAGEQVTYTCATYYKMDGASNVTCINSRWTGRP

TCRDTSCVNPPTVQNAYIVSRQMSKYPSGERVRYQCRSPY

EMFGDEEVMCLNGNWTEPPQCKDSTGKCGPPPPIDNGDIT

SFPLSVYAPASSVEYQCONLYQLEGNKRITCRNGQWSEPP

KCLHPCVISREIMENYNIALRWTAKQKLYSRTGESVEFVC

KRGYRLSSRSHTLRTTCWDGKLEYPTCAKR

"Derived from" in the context of an amino acid sequence or polynucleotide sequence (e.g., an amino acid sequence "derived from" NspA) is meant to indicate that the polypeptide or nucleic acid has a sequence that is based on that of a reference polypeptide or nucleic acid (e.g., a naturally occurring NspA protein or encoding nucleic acid), and is not meant to be limiting as to the source or method in which the protein or nucleic acid is made. Non-limiting examples of reference polypeptides and reference polynucleotides from which an amino acid sequence or polynucleotide sequence may be "derived from" include a naturally-occurring NspA (e.g., the amino acid sequence set forth in SEQ ID NO:1), and a non-naturally-occurring NspA. "Derived from" in the context of bacterial strains is meant to indicate that a strain was obtained through passage in vivo, or in in vitro culture, of a parental strain and/or is a recombinant cell obtained by modification of a parental strain.

Percent identity between a pair of sequences may be calculated by multiplying the number of matches in the pair by 100 and dividing by the length of the aligned region, including gaps. Identity scoring only counts perfect matches and does not consider the degree of similarity of amino acids to one another. Only internal gaps are included in the length, not gaps at the sequence ends.

Percent Identity=(Matches×100)/Length of aligned region (with gaps)

"Conservative amino acid substitution" refers to a substitution of one amino acid residue for another sharing chemical and physical properties of the amino acid side chain (e.g., charge, size, hydrophobicity/hydrophilicity). "Conservative substitutions" are intended to include substitution within the following groups of amino acid residues: gly, ala; val, ile, leu; asp, glu; asn, gln; ser, thr; lys, arg; and phe, tyr. Guidance for such substitutions can be drawn from alignments of amino acid sequences of polypeptides presenting the epitope of interest.

The term "protective immunity" means that a vaccine or immunization schedule that is administered to a mammal induces an immune response that prevents, retards the development of, or reduces the severity of a disease that is caused by *N. meningitidis*, or diminishes or altogether eliminates the symptoms of the disease. Protective immunity can be accompanied by production of bactericidal antibodies. It should be noted that production of bactericidal antibodies against *N. meningitidis* is accepted in the field as predictive of a vaccine's protective effect in humans. (Goldschneider et al. (1969) *J. Exp. Med.* 129:1307; Borrow et al. (2001) *Infect Immun.* 69:1568).

The phrase "a disease caused by a strain of *N. meningitidis*" encompasses any clinical symptom or combination of clinical symptoms that are present in an infection of a human with a *N. meningitidis*. These symptoms include but are not limited to: colonization of the upper respiratory tract (e.g. mucosa of the nasopharynx and tonsils) by a pathogenic strain of *N. meningitidis*, penetration of the bacteria into the mucosa and the submucosal vascular bed, septicemia, septic shock, inflammation, hemorrhagic skin lesions, activation of fibrinolysis and of blood coagulation, organ dysfunction such as kidney, lung, and cardiac failure, adrenal hemorrhaging and muscular infarction, capillary leakage, edema, peripheral limb ischemia, respiratory distress syndrome, pericarditis and meningitis.

The phrase "specifically binds to an antibody" or "specifically immunoreactive with", in the context of an antigen (e.g., a polypeptide antigen) refers to a binding reaction that is based on and/or is probative of the presence of the antigen in a sample which may also include a heterogeneous population of other molecules. Thus, under designated conditions, the specified antibody or antibodies bind(s) to a particular antigen or antigens in a sample and do not bind in a significant amount to other molecules present in the sample. "Specifically binds to an antibody" or "specifically immunoreactive with" in the context of an epitope of an antigen (e.g., an epitope of a polypeptide) refers to a binding reaction which is based on and/or is probative of the presence of the epitope in an antigen (e.g., polypeptide) which may also include a heterogeneous population of other epitopes, as well as a heterogeneous population of antigens. Thus, under designated conditions, the specified antibody or antibodies bind(s) to a particular epitope of an antigen and do not bind in a significant amount to other epitopes present in the antigen and/or in the sample.

The phrase "in a sufficient amount to elicit an immune response" means that there is a detectable difference between an immune response indicator measured before and after administration of a particular antigen preparation. Immune response indicators include but are not limited to: antibody titer or specificity, as detected by an assay such as enzyme-linked immunosorbent assay (ELISA), bactericidal assay, flow cytometry, immunoprecipitation, Ouchterlony immunodiffusion; binding detection assays of, for example, spot, Western blot or antigen arrays; cytotoxicity assays, etc.

A "surface antigen" is an antigen that is present in a surface structure of *N. meningitidis* (e.g. the outer membrane, capsule, pili, etc.).

"Isolated" refers to an entity of interest that is in an environment different from that in which the compound may naturally occur. "Isolated" is meant to include compounds that are within samples that are substantially enriched for the compound of interest and/or in which the compound of interest is partially or substantially purified. In some cases, an isolated component (e.g., a polypeptide, such as an NspA variant of the present disclosure; a nucleic acid of the present disclosure; a recombinant vector of the present disclosure) is purified, e.g., the isolated component is at least 80%, at least 85%, at least 90%, at least 95%, at least 98%, at least 99%, or greater than 99%, pure.

"Enriched" means that a sample is non-naturally manipulated (e.g., by an experimentalist or a clinician) so that a compound of interest is present in a greater concentration (e.g., at least a three-fold greater, at least 4-fold greater, at least 8-fold greater, at least 64-fold greater, or more) than the concentration of the compound in the starting sample, such as a biological sample (e.g., a sample in which the compound naturally occurs or in which it is present after administration), or in which the compound was made (e.g., as in a bacterial polypeptide, antibody, nucleic acid, and the like).

Before the present invention is further described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a," "an," and "the" include plural referents unless the context clearly dictates otherwise. Thus, for example, reference to "a NspA" includes a plurality of such NspA and reference to "the immunogenic composition" includes reference to one or more immunogenic compositions and equivalents thereof known to those skilled in the art, and so forth. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. All combinations of the embodiments pertaining to the invention are specifically embraced by the present invention and are disclosed herein just as if each and every combination was individually and explicitly disclosed. In addition, all sub-combinations of the various embodiments and elements thereof are also specifically embraced by the present invention and are disclosed herein just as if each and every such sub-combination was individually and explicitly disclosed herein.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

DETAILED DESCRIPTION

The present disclosure provides variant NspA that can elicit antibodies that are bactericidal for at least one strain of *N. meningitidis*. The present disclosure provides compositions, including immunogenic compositions, comprising a variant NspA of the present disclosure. The present disclosure provides methods of use of variant NspA of the present disclosure, or a composition comprising a variant NspA of the present disclosure.

Variant NSPA

The present disclosure provides variant NspA that differ in amino acid sequence from a wild-type *N. meningitidis* NspA by from 1 to 15 amino acids (e.g., by from 1 to 13 amino acids, 1 to 10, 1 to 7 amino acids, 1 to 6 amino acids, 1 to 5 amino acids, 1 to 4 amino acids, 1 to 3 amino acids, 1 to 2 amino acids, or one amino acid, such that the variant NspA exhibits reduced binding to human factor H (FH), compared to a reference NspA. The variant NspA is useful for eliciting an immune response, e.g., a bactericidal immune response to one or more *N. meningitidis* strains when administered to a mammalian host. In some cases, the variant NspA differs in amino acid sequence from a reference wild-type *N. meningitidis* NspA by no more than from 1 to 10 acid substitutions. In some cases, the variant NspA differs in amino acid sequence from a reference wild-type *N. meningitidis* NspA by only one amino acid substitution.

In some cases, variant NspA of the present disclosure comprises an amino acid sequence having at least 90%, at least 95%, at least 98%, or at least 99%, amino acid sequence identity to a reference NspA sequence; where the variant NspA comprises one or more amino acid substitutions relative to the reference NspA sequence such that the variant NspA exhibits a binding affinity for human FH that is 85% or less of the binding affinity of the reference NspA for human FH, e.g., the variant NspA exhibits an affinity for human FH that is from about 85% to about 75%, from about 75% to about 65%, from about 65% to about 55%, from about 55% to about 45%, from about 45% to about 35%, from about 35% to about 25%, from about 25% to about 15%, from about 15% to about 10%, from about 10% to about 5%, from about 5% to about 2%, from about 2% to about 1%, or from about 1% to about 0.1%, or less than 0.1%, of the binding affinity of the affinity of the reference NspA for human FH. The variant NspA may induce an immune response, e.g., a bactericidal immune response to at least one strain of *N. meningitidis* when administered to a mammalian host (e.g., a human; or a non-human animal model).

Such a variant NspA may comprise an amino acid sequence at least 90% identical to the amino acid sequence of SEQ ID NO:1 and may comprise (a) an amino acid substitution of the lysine (K) at position 72 with an uncharged amino acid or a negatively charged amino acid; (b) an amino acid substitution of the aspartic acid (D) at position 77 with an uncharged amino acid or a positively charged amino acid; (c) an amino acid substitution of the aspartic acid (D) at position 113 with an uncharged amino acid or a positively charged amino acid, wherein when the amino acid substitution at position 113 is with histidine, the variant NspA does not comprise a substitution of valine at position 112 with alanine; or (d) an amino acid substitution of the aspartic acid (D) at position 118 with an uncharged amino acid or a positively charged amino acid, wherein the amino acid substitutions are relative to the amino acid sequence of SEQ ID NO:1.

A variant NspA of the present disclosure maintains substantially the same conformation of a reference (e.g., wild-type) NspA that binds human FH when the reference NspA is in its native conformation. Whether a variant NspA of the present disclosure maintains substantially the same conformation of a reference (e.g., wild-type) NspA that binds human FH can be determined using antibodies that bind wild-type NspA when the wild-type NspA is in its native conformation. Such antibodies include, e.g., anti-NspA monoclonal antibodies, AL-12 and 14C7. For example, in some cases, a variant NspA of the present disclosure retains binding to AL-12 or 14C7; e.g., a variant NspA of the present disclosure retains at least 75%, at least 80%, at least 85%, at least 90%, or at least 95%, binding to AL-12 or 14C7 of a reference NspA (e.g., an NspA having the amino acid sequence set forth in SEQ ID NO:1) in its native conformation.

Variants of NspA

A "reference NspA" from which a variant NspA of the present disclosure is derived is in some cases NspA of *N. meningitidis* serogroup W strain Sudan 1/06 (Su 1/06). The amino acid sequence of this NspA is set out in FIG. 1 and is reproduced below.

```
NspA Su 1/06:
                                              (SEQ ID NO: 1)
MKKALATLIALALPAAALAEGASGFYVQADAA

HAKASSSLGSAKGFSPRISAGYRINDLRFAVD

YTRYKNYKAPSTDFKLYSIGASAIYDFDTQSP

VKPYLGARLSLNRASVDLGGSDSFSQTSTGLG

VLAGVSYAVTPNVDLDAGYRYNYIGKVNTVKN

VRSGELSAGVRVKF
```

The underlined residues indicate the amino acids that can be substituted to reduce binding of NspA to human FH. In some embodiments, the reference NspA may be NspA expressed from a different *N. meningitidis* strain, such as, a particular *N. meningitidis* of serogroup A, B, C, X, or Y. In some embodiments, the reference NspA may be NspA expressed from a different *N. meningitidis* strain of the serogroup W.

In some embodiments, the variant NspA disclosed herein have reduced binding to human FH, which human FH is present in a human. In other words, the human FH is isolated from a human blood sample, e.g., serum sample. In some embodiments, the variant NspA disclosed herein have reduced binding to human FH, which human FH is recombinant human FH expressed in a host, such as, a recombinant bacterium, yeast, mammalian cell line, a transgenic mammal, such as, a rodent, e.g., a rat or mouse.

As noted above, the variant NspA disclosed herein may comprise an amino acid sequence at least 90% identical to the amino acid sequence of SEQ ID NO:1 and may comprise (a) an amino acid substitution of the lysine (K) at position 72 with an uncharged amino acid or a negatively charged amino acid; (b) an amino acid substitution of the aspartic acid (D) at position 77 with an uncharged amino acid or a positively charged amino acid; (c) an amino acid substitution of the aspartic acid (D) at position 113 with an uncharged amino acid or a positively charged amino acid, wherein when the amino acid substitution at position 113 is with histidine, the variant NspA does not comprise a substitution of valine at position 112 with alanine; or (d) an amino acid substitution of the aspartic acid (D) at position 118 with an uncharged amino acid or a positively charged amino acid, wherein the amino acid substitutions are relative to the amino acid sequence of SEQ ID NO:1.

As used herein, uncharged amino acid refers to an amino acid that has an uncharged side chain at physiological pH. For example, the uncharged amino acid may be an amino acid comprising a non-polar side chain, e.g., glycine, alanine, valine, leucine, methionine or isoleucine. In other embodiments, the uncharged amino acid may be an amino acid comprising a polar side chain, e.g., serine, threonine, cysteine, proline, asparagine or glutamine. In other embodiments, the uncharged amino acid may be an amino acid comprising a non-polar, aromatic side chain, e.g., phenylalanine, tyrosine, or tryptophan. Negatively charged amino acids comprise aspartic acid and glutamic acid and the positively charged amino acids comprise lysine, histidine, and arginine.

In certain embodiments, the substituting amino acid is alanine. In other words, an alanine is present at amino acid positions 72, 77, 113, or 118. For example, the substitution is K72A, D77A, D113A, or D118A. In certain embodiments, the variant NspA does not comprise a V112A substitution. In certain embodiments, the variant NspA does not comprise an amino acid substitution of V at position 112.

In certain embodiments, the variant NspA may comprise an amino acid sequence that is at least 95% identical, at least 96% identical, at least 97% identical, at least 98% identical, or at least 99% identical to the amino acid sequence of SEQ ID NO:1. In certain embodiments, the variant NspA may comprise an amino acid sequence that is at least 95% identical, at least 96% identical, at least 97% identical, at least 98% identical, or at least 99% identical to the amino acid sequence of SEQ ID NO:1 and does not include an alanine at position 7.

In certain embodiments, the variant NspA may comprise an amino acid sequence set forth in SEQ ID NO:1 but comprising one or more of the following substitutions: K72A/V/L/I, D77A/V/L/I, D113A/V/L/I, and D118A/V/L/I.

In certain embodiments, the amino acid sequence of the variant NspA is the amino acid sequence of a *N. meningitidis* NspA with the amino acid substitution(s) disclosed herein. In certain embodiments, the NspA is from a *N. meningitidis* of serogroup W-135, e.g., strain Sudan 1/06. In certain embodiments, the NspA is from a *N. meningitidis* of serogroup A strain, e.g., ST-4. In certain embodiments, the NspA is from a *N. meningitidis* of serogroup B strain, e.g., MC58 or NMB-CDC. In certain embodiments, the NspA is from a *N. meningitidis* of serogroup C strain, e.g., FAM18. In certain embodiments, the NspA is from a *N. meningitidis* of serogroup X strain. In certain embodiments, the NspA is from a *N. meningitidis* of serogroup Y strain.

Combinations of Amino Acid Substitutions

In some cases, a variant NspA of the present disclosure comprises an amino acid sequence having at least 90%, at least 95%, at least 98%, or at least 99%, amino acid sequence identity to SEQ ID NO:1, where the variant NspA binds human FH with an affinity that 50% or less (e.g., from about 50% to about 45%, from about 45% to about 35%, from about 35% to about 25%, from about 25% to about 15%, from about 15% to about 10%, from about 10% to about 5%, from about 5% to about 2%, from about 2% to about 1%, or from about 1% to about 0.1%, or less than 0.1%) of the affinity of the reference NspA (SEQ ID NO:1) for human FH, where the variant induces a bactericidal antibody response to at least one strain of *N. meningitidis* in a mammalian host, and where the variant NspA comprises an amino acid substitution selected from two or more of: (a) an amino acid substitution of the lysine (K) at position 72 with an uncharged amino acid or a negatively charged amino acid; (b) an amino acid substitution of the aspartic acid (D) at position 77 with an uncharged amino acid or a positively charged amino acid; (c) an amino acid substitution of the aspartic acid (D) at position 113 with an uncharged amino acid or a positively charged amino acid, wherein when the amino acid substitution at position 113 is with histidine, the variant NspA does not comprise a substitution of valine at position 112 with alanine; or (d) an amino acid substitution of the aspartic acid (D) at position 118 with an uncharged amino acid or a positively charged amino acid, wherein the amino acid substitutions are relative to the amino acid sequence of SEQ ID NO:1.

Fusion Polypeptides

A variant NspA of the present disclosure can be a fusion polypeptide, e.g., a polypeptide comprising a variant NspA as described above, and a heterologous polypeptide (e.g., a fusion partner). The fusion partner can be at the N-terminus of the variant NspA, at the C-terminus of the variant NspA, or at an internal site within the NspA.

Suitable fusion partners include peptides and polypeptides that confer enhanced stability in vivo (e.g., enhanced serum half-life); provide ease of purification, e.g., (His)$_n$, e.g., 6His, and the like; provide for secretion of the fusion protein from a cell; provide an epitope tag, e.g., GST, hemagglutinin (HA; e.g., YPYDVPDYA; SEQ ID NO:3), FLAG (e.g., DYKDDDDK; SEQ ID NO:4), c-myc (e.g., EQKLISEEDL; SEQ ID NO:5), and the like; provide a detectable signal, e.g., an enzyme that generates a detectable product (e.g., (3-galactosidase, luciferase), or a protein that is itself detectable, e.g., a green fluorescent protein, a yellow fluorescent protein, etc.; provides for multimerization, e.g., a multimerization domain such as an Fc portion of an immunoglobulin; and the like; and/or promotes protein solubility, e.g., maltose binding protein (MBP), glutathione S-transferase (GST), Small Ubiquitin-like Modifier (SUMO), etc.

Methods of Production

An NspA of the present disclosure can be produced by any suitable method, including recombinant and non-recombinant methods (e.g., chemical synthesis). Where the subject NspA is produced using recombinant techniques, the methods can involve any suitable construct and any suitable host cell, which can be a prokaryotic or eukaryotic cell, usually a bacterial or yeast host cell, more usually a bacterial cell. Methods for introduction of genetic material into host cells include, for example, transformation, electroporation, conjugation, calcium phosphate methods and the like. The method for transfer can be selected so as to provide for stable expression of the introduced NspA-encoding nucleic acid. The NspA-encoding nucleic acid can be provided as an inheritable episomal element (e.g., plasmid) or can be genomically integrated.

The present disclosure provides nucleic acids (including isolated nucleic acids) that comprise a nucleotide sequence encoding a NspA variant of the present disclosure. In some embodiments, the nucleotide sequence encoding the NspA variant is operably linked to a transcriptional control element, e.g., a promoter. The promoter is in some cases constitutive. The promoter is in some cases inducible. In some cases, the promoter is suitable for use (e.g., active in) a prokaryotic host cell. In some cases, the promoter is suitable for use (e.g., active in) a eukaryotic host cell.

In some instances, a nucleic acid comprising a nucleotide sequence encoding a NspA variant of the present disclosure is present in an expression vector. The present disclosure provides a recombinant expression vector (e.g., an isolated recombinant expression vector) that comprises a nucleotide sequence encoding a NspA variant of the present disclosure. In some embodiments, the nucleotide sequence encoding the NspA variant is operably linked to a transcriptional control element, e.g., a promoter. The promoter is in some cases constitutive. The promoter is in some cases inducible. In some cases, the promoter is suitable for use (e.g., active in) a prokaryotic host cell. In some cases, the promoter is suitable for use (e.g., active in) a eukaryotic host cell.

Suitable vectors for transferring NspA-encoding nucleic acid can vary in composition. Integrative vectors can be conditionally replicative or suicide plasmids, bacteriophages, and the like. The constructs can include various elements, including for example, promoters, selectable genetic markers (e.g., genes conferring resistance to antibiotics (for instance kanamycin, erythromycin, chloramphenicol, or gentamycin)), origin of replication (to promote replication in a host cell, e.g., a bacterial host cell), and the like. The choice of vector will depend upon a variety of factors such as the type of cell in which propagation is desired and the purpose of propagation. Certain vectors are useful for amplifying and making large amounts of the desired DNA sequence. Other vectors are suitable for expression in cells in culture. Still other vectors are suitable for transfer and expression in cells in a whole animal. The choice of appropriate vector is well within the skill of the art. Many such vectors are available commercially.

In one example, the vector is an expression vector based on episomal plasmids containing selectable drug resistance markers and elements that provide for autonomous replication in different host cells (e.g., in both *E. coli* and *N. meningitidis*). One example of such a "shuttle vector" is the plasmid pFP10 (Pagotto et al. (2000) Gene 244:13-19).

Constructs (recombinant vectors) can be prepared by, for example, inserting a polynucleotide of interest into a construct backbone, typically by means of DNA ligase attachment to a cleaved restriction enzyme site in the vector. Alternatively, the desired nucleotide sequence can be inserted by homologous recombination or site-specific recombination. Typically, homologous recombination is accomplished by attaching regions of homology to the vector on the flanks of the desired nucleotide sequence, while site-specific recombination can be accomplished through use of sequences that facilitate site-specific recombination (e.g., cre-lox, att sites, etc.). Nucleic acid containing such sequences can be added by, for example, ligation of oligonucleotides, or by polymerase chain reaction using primers comprising both the region of homology and a portion of the desired nucleotide sequence.

Vectors can provide for extrachromosomal maintenance in a host cell or can provide for integration into the host cell genome. Vectors are amply described in numerous publications well known to those in the art, including, e.g., Short Protocols in Molecular Biology, (1999) F. Ausubel, et al., eds., Wiley & Sons. Vectors may provide for expression of the nucleic acids encoding the subject NspA, may provide for propagating the subject nucleic acids, or both.

Examples of vectors that may be used include but are not limited to those derived from recombinant bacteriophage DNA, plasmid DNA or cosmid DNA. For example, plasmid vectors such as pBR322, pUC 19/18, pUC 118, 119 and the M13 mp series of vectors may be used. pET21 is also an expression vector that may be used. Bacteriophage vectors may include), µgt10, λgt11, λgt18-23, λZAP/R and the EMBL series of bacteriophage vectors. Further vectors that may be utilized include, but are not limited to, pJB8, pCV 103, pCV 107, pCV 108, pTM, pMCS, pNNL, pHSG274, COS202, COS203, pWE15, pWE16 and the charomid 9 series of vectors.

For expression of a subject NspA, an expression cassette may be employed. Thus, the present disclosure provides a recombinant expression vector comprising a subject nucleic acid. The expression vector provides transcriptional and translational regulatory sequences, and may provide for inducible or constitutive expression, where the coding region is operably linked under the transcriptional control of the transcriptional initiation region, and a transcriptional and translational termination region. These control regions may be native to an NspA from which the subject NspA is derived, or may be derived from exogenous sources. In general, the transcriptional and translational regulatory sequences may include, but are not limited to, promoter sequences, ribosomal binding sites, transcriptional start and stop sequences, translational start and stop sequences, and enhancer or activator sequences. Promoters can be either constitutive or inducible, and can be a strong constitutive promoter (e.g., T7, and the like).

Expression vectors generally have convenient restriction sites located near the promoter sequence to provide for the insertion of nucleic acid sequences encoding proteins of interest. A selectable marker operative in the expression host may be present to facilitate selection of cells containing the vector. In addition, the expression construct may include additional elements. For example, the expression vector may have one or two replication systems, thus allowing it to be maintained in organisms, for example in mammalian or insect cells for expression and in a prokaryotic host for cloning and amplification. In addition, the expression construct may contain a selectable marker gene to allow the selection of transformed host cells. Selection genes are well known in the art and will vary with the host cell used.

It should be noted that an NspA of the present disclosure may comprise additional elements, such as a detectable label, e.g., a radioactive label, a fluorescent label, a biotin label, an immunologically detectable label (e.g., a hemagglutinin tag, a poly-Histidine tag) and the like. Additional elements can be provided to facilitate isolation (e.g., biotin tag, immunologically detectable tag) through various methods (e.g., affinity capture, etc.). The subject NspA can optionally be immobilized on a support through covalent or non-covalent attachment.

Isolation and purification of NspA can be accomplished according to methods known in the art. For example, NspA can be isolated from a lysate of cells genetically modified to express a NspA, or from a synthetic reaction mix (i.e. in vitro transcription/translation reaction), by immunoaffinity purification, which generally involves contacting the sample with an anti-NspA antibody (e.g., an anti-NspA monoclonal antibody (mAb), such as a AL-12 and 14C7 or other appropriate MAb known in the art), washing to remove non-specifically bound material, and eluting specifically bound NspA. Isolated NspA can be further purified by dialysis and other methods normally employed in protein purification. In one example, the NspA can be isolated using metal chelate chromatography methods.

Host Cells

Any of a number of suitable host cells can be used in the production of NspA. In general, the NspA described herein may be expressed in prokaryotes or eukaryotes, e.g., bacteria such as *Escherichia coli* or *Neisseria* (e.g., *N. meningitidis*) in accordance with conventional techniques. Thus, the present disclosure further provides a genetically modified in vitro host cell, which contains a nucleic acid encoding a subject NspA. Host cells for production (including large scale production) of a subject NspA can be selected from any of a variety of available host cells. Examples of host cells for expression include those of a prokaryotic or eukaryotic unicellular organism, such as bacteria (e.g., *Escherichia coli* strains), yeast (e.g., *Saccharomyces cerevisiae, Pichia* spp., and the like), and may include host cells originally derived from a higher organism such as insects, vertebrates, e.g., mammals. Suitable mammalian cell lines include, but are not limited to, HeLa cells (e.g., American Type Culture Collection (ATCC) No. CCL-2), CHO cells (e.g., ATCC Nos. CRL9618, CCL61, CRL9096), Vero cells, NIH 3T3 cells (e.g., ATCC No. CRL-1658), Huh-7 cells, BHK cells (e.g., ATCC No. CCL10), PC12 cells (ATCC No. CRL1721), COS cells, COS-7 cells (ATCC No. CRL1651), RAT1 cells, mouse L cells (ATCC No. CCLI.3), human embryonic kidney (HEK)293 cells (ATCC No. CRL1573), HLHepG2 cells, and the like.). In some cases, bacterial host cells and yeast host cells are of particular interest for subject NspA production.

Subject NspA variants can be prepared in substantially pure or substantially isolated form (i.e., substantially free from other Neisserial or host cell polypeptides) or substantially isolated form. The subject NspA can be present in a composition that is enriched for the polypeptide relative to other components that may be present (e.g., other polypeptides or other host cell components). Purified subject NspA can be provided such that the polypeptide is present in a composition that is substantially free of other expressed polypeptides, e.g., less than 90%, usually less than 60% and more usually less than 50% of the composition is made up of other expressed polypeptides.

Host Cells for Vesicle Production

Where a subject NspA is to be provided in a membrane vesicle (as discussed in more detail below), a Neisserial host cell is genetically modified to express a subject NspA. Any of a variety of *Neisseria* spp. strains can be modified to produce a subject NspA, and, optionally, which produce or can be modified to produce other antigens of interest, such as PorA or Factor H binding protein (FHbp), can be used in the methods disclosed herein.

Methods and vectors to provide for genetic modification of Neisserial strains and expression of a desired polypeptide are known in the art. Examples of vectors and methods can be found in WO 02/09746 and O'Dwyer et al. (2004) Infect Immun 72:6511-80. Strong promoters, particularly constitutive strong promoters are of particular interest. Examples of promoters include the promoters of porA, porB, lbpB, tbpB, p110, hpuAB, lgtF, opa, p110, 1st, hpuAB, and rmp.

Pathogenic *Neisseria* spp. or strains derived from pathogenic *Neisseria* spp., particularly strains pathogenic for humans or derived from pathogenic or commensal for humans, are of particular interest for use in membrane vesicle production. Examples of *Neisseria* spp. include *N. meningitidis, N. flavescens, N. gonorrhoeae, N. lactamica, N. polysaccharea, N. cinerea, N. mucosa, N. subflava, N. sicca, N. elongata*, and the like.

*N. meningitidis* strains are of particular interest for genetic modification to express the subject NspA variants and for use in vesicle production. The strain used for vesicle production can be selected according to a number of different characteristics that may be desired. For example, the strain may be selected according to: a desired PorA type (a "serosubtype"), capsular group, serotype, and the like;

decreased capsular polysaccharide production; and the like. For example, the production strain can produce any desired PorA polypeptide, and may express one or more PorA polypeptides (either naturally or due to genetic engineering). Examples of strains include those that produce a PorA polypeptide which confers a serosubtype of P1.7,16; P1.19, 15; P1.7,1; P1.5,2; P1.22a,14; P1.14; P1.5,10; P1.7,4; P1.12, 13; as well as variants of such PorA polypeptides which may or may not retain reactivity with conventional serologic reagents used in serosubtyping. Also of interest are PorA polypeptides characterized according to PorA variable region (VR) typing (see, e.g., Russell et al. (2004) Emerging Infect Dis 10:674-678; Sacchi C T et al. (1998) Clin Diagn Lab Immunol 5:845-55; Sacchi et al (2000) J. Infect Dis 182:1169-1176). A substantial number of distinct VR types have been identified, which can be classified into VR1 and VR2 family "prototypes". A web-accessible database describing this nomenclature and its relationship to previous typing schemes is found at neisseria.org/nm/typing/pora. Alignments of certain PorA VR1 and VR2 types are provided in Russell et al. (2004) Emerging Infect Dis 10:674-678.

Alternatively or in addition, the production strain can be a capsule deficient strain. Capsule deficient strains can provide vesicle-based vaccines that provide for a reduced risk of eliciting a significant autoantibody response in a subject to whom the vaccine is administered (e.g., due to production of antibodies that cross-react with sialic acid on host cell surfaces). "Capsule deficient" or "deficient in capsular polysaccharide" as used herein refers to a level of capsular polysaccharide on the bacterial surface that is lower than that of a naturally-occurring strain or, where the strain is genetically modified, is lower than that of a parental strain from which the capsule deficient strain is derived. A capsule deficient strain includes strains that are decreased in surface capsular polysaccharide production by at least 10%, 20%, 25%, 30%, 40%, 50%, 60%, 75%, 80%, 85%, 90% or more, and includes strains in which capsular polysaccharide is not detectable on the bacterial surface (e.g., by whole cell enzyme-linked immunosorbent assay (ELISA) using an anti-capsular polysaccharide antibody).

Capsule deficient strains include those that are capsule deficient due to a naturally-occurring or recombinantly-generated genetic modification. Naturally-occurring capsule deficient strains (see, e.g., Dolan-Livengood et al. (2003) J. Infect. Dis. 187:1616-28), as well as methods of identifying and/or generating capsule-deficient strains (see, e.g., Fisseha et al. (2005) Infect. Immun 73:4070-4080; Stephens et al. (1991) Infect Immun 59:4097-102; Frosch et al. (1990) Mol Microbiol.4:1215-1218) are known in the art.

Modification of a Neisserial host cell to provide for decreased production of capsular polysaccharide may include modification of one or more genes involved in capsule synthesis, where the modification provides for, for example, decreased levels of capsular polysaccharide relative to a parent cell prior to modification. Such genetic modifications can include changes in nucleotide and/or amino acid sequences in one or more capsule biosynthesis genes rendering the strain capsule deficient (e.g., due to one or more insertions, deletions, substitutions, and the like in one or more capsule biosynthesis genes). Capsule deficient strains can lack or be non-functional for one or more capsule genes.

Of particular interest are strains that are deficient in sialic acid biosynthesis. Such strains can provide for production of vesicles that have reduced risk of eliciting anti-sialic acid antibodies that cross-react with human sialic acid antigens, and can further provide for improved manufacturing safety. Strains having a defect in sialic acid biosynthesis (due to either a naturally occurring modification or an engineered modification) can be defective in any of a number of different genes in the sialic acid biosynthetic pathway. Of particular interest are strains that are defective in a gene product encoded by the N-acetylglucosamine-6-phosphate 2-epimerase gene (known as synX AAF40537.1 or siaA AAA20475), with strains having this gene inactivated being of especial interest. For example, in one embodiment, a capsule deficient strain is generated by disrupting production of a functional synX gene product (see, e.g., Swartley et al. (1994) J Bacteriol. 176:1530-4).

Capsule-deficient strains can also be generated from naturally-occurring strains using non-recombinant techniques, e.g., by use of bactericidal anti-capsular antibodies to select for strains with reduced levels of capsular polysaccharide.

Where the disclosure involves use of two or more strains (e.g., to produce antigenic compositions containing a subject NspA-presenting vesicles from different strains), the strains can be selected so as to differ in one or more strain characteristics, e.g., to provide for vesicles that differ in the subject NspA used, PorA, and the like.

Preparation of Vesicles

The antigenic compositions contemplated by the present disclosure generally include vesicles prepared from Neisserial cells that express a subject NspA. As referred to herein "vesicles" is meant to encompass outer membrane vesicles as well as microvesicles (which are also referred to as blebs).

The antigenic composition can contain outer membrane vesicles (OMVs) prepared from the outer membrane of a cultured strain of N. meningitidis genetically modified to express a subject NspA. OMVs may be obtained from N. meningitidis grown in broth or solid medium culture, preferably by separating the bacterial cells from the culture medium (e.g. by filtration or by a low-speed centrifugation that pellets the cells, or the like), lysing the cells (e.g. by addition of detergent, osmotic shock, sonication, cavitation, homogenization, or the like) and separating an outer membrane fraction from cytoplasmic molecules (e.g. by filtration; or by differential precipitation or aggregation of outer membranes and/or outer membrane vesicles, or by affinity separation methods using ligands that specifically recognize outer membrane molecules; or by a high-speed centrifugation that pellets outer membranes and/or outer membrane vesicles, or the like); outer membrane fractions may be used to produce OMVs.

The antigenic composition can contain microvesicles (MVs) (or “blebs”) containing subject NspA variants, where the MVs or blebs are released during liquid culture of a *N. meningitidis* strain genetically modified to express a subject NspA. For example, MVs may be obtained by culturing a strain of *N. meningitidis* in broth culture medium, separating whole cells from the broth culture medium (e.g. by filtration, or by a low-speed centrifugation that pellets only the cells and not the smaller blebs, or the like), and then collecting the MVs that are present in the cell-free culture medium (e.g. by filtration, differential precipitation or aggregation of MVs, or by a high-speed centrifugation that pellets the blebs, or the like). Strains for use in production of MVs can generally be selected on the basis of the amount of blebs produced in culture (e.g., bacteria can be cultured in a reasonable number to provide for production of blebs suitable for isolation and administration in the methods described herein). An exemplary strain that produces high levels of blebs is described in PCT Publication No. WO 01/34642. In addition to bleb production, strains for use in MV production may also be selected on the basis of NspA production, where strains that produce higher levels of NspA may be of particular interest (for examples of *N. meningitidis* strains having different NspA production levels, see, e.g., Moe et al. (1999 Infect. Immun 67: 5664). Other strains of interest for use in production of blebs include strains having an inactivated GNA33 gene, which encodes a lipoprotein required for cell separation, membrane architecture and virulence (see, e.g., Adu-Bobie et al. (2004) Infect Immun 72:1914-1919).

The antigenic compositions of the present disclosure can contain vesicles from one strain, or from 2, 3, 4, 5 or more strains, which strains may be homologous or heterologous, usually heterologous, to one another. For example, the strains may be homologous or heterologous with respect to PorA and/or the NspA from which the subject NspA is derived.

The antigenic compositions can comprise a mixture of OMVs and MVs presenting the same or different subject NspAs and optionally where the OMVs and/or MVs may be from the same or different strains. Vesicles from different strains can be administered as a mixture, or can be administered serially.

Where desired (e.g., where the strains used to produce vesicles are associated with endotoxin or particular high levels of endotoxin), the vesicles are optionally treated to reduce endotoxin, e.g., to reduce toxicity following administration. Although less desirable as discussed below, reduction of endotoxin can be accomplished by extraction with a suitable detergent (for example, BRIJ-96, sodium deoxycholate, sodium lauroylsarcosinate, Empigen BB, Triton X-100, non-ionic detergent TWEEN 20 (sorbitan monolaurate polyoxyethylene), non-ionic detergent TWEEN 80, at a concentration of 0.1-10%, e.g., 0.5-2%, and sodium dodecyl sulfate (SDS)). Where detergent extraction is used, it is preferable to use a detergent other than deoxycholate.

The vesicles of the antigenic compositions can be prepared without detergent, e.g., without use of deoxycholate. It may be desirable to decrease endotoxin activity using technology that does not require a detergent. In one approach, strains that are relatively low producers of endotoxin (lipopolysaccharide, LPS) are used so as to avoid the need to remove endotoxin from the final preparation prior to use in humans. For example, the vesicles can be prepared from *Neisseria* mutants in which lipooligosaccharide or other antigens that may be undesirable in a vaccine (e.g. Rmp) is reduced or eliminated.

Vesicles can be prepared from *N. meningitidis* strains that contain genetic modifications that result in decreased or no detectable toxic activity of lipid A. For example, such strain can be genetically modified in lipid A biosynthesis (Steeghs et al. (1999) Infect Immun 67:4988-93; van der Ley et al. (2001) Infect Immun 69:5981-90; Steeghs et al. (2004) J Endotoxin Res 10:113-9; Fissha et al, (2005) Infect Immun 73:4070). The immunogenic compositions may be detoxified by modification of LPS, such as downregulation and/or inactivation of the enzymes encoded by 1pxL1 or 1pxL2, respectively. Production of a penta-acylated lipid A made in 1pxL1 mutants indicates that the enzyme encoded by 1pxL1 adds the C12 to the N-linked 3-OH C14 at the 2' position of GlcN II. The major lipid A species found in 1pxL2 mutants is tetra-acylated, indicating the enzyme encoded by 1pxL2 adds the other C12, i.e., to the N-linked 3-OH C14 at the 2 position of GlcN I. Mutations resulting in a decreased (or no) expression of these genes (or decreased or no activity of the products of these genes) result in altered toxic activity of lipid A (van der Ley et al. (2001) Infect Immun 69:5981-90). Tetra-acylated (lpxL2 mutant) and penta acylated (lpxL1 mutant) lipid A are less toxic than the wild-type lipid A. Mutations in the lipid A 4'-kinase encoding gene (IpxK) also decrease the toxic activity of lipid A. Of particular interest for use in production of vesicles (e.g., MV or OMV) are *N. meningitidis* strains genetically modified so as to provide for decreased or no detectable functional LpxL1-encoded protein, e.g., where the *Neisseria* bacterium (e.g., *N. meningitidis* strain) is genetically modified to provide for decreased or no activity of a gene product of the 1pxL1 gene. For example, the *Neisseria* bacterium can be genetically modified to have an 1pxL1 gene knockout, e.g., where the 1pxL1 gene is disrupted. See, e.g., US Patent Publication No. 2009/0035328. The *Neisseria* bacterium can be genetically modified to provide for decreased or no activity of a gene product of the 1pxL2 gene. The *Neisseria* bacterium can be genetically modified to provide for decreased or no activity of a gene product of the 1pxL1 gene and the 1pxL2 gene. Such vesicles provide for reduced toxicity as compared to *N. meningitidis* strains that are wild-type for LPS production, while retaining immunogenicity of subject NspA.

LPS toxic activity can also be altered by introducing mutations in genes/loci involved in polymyxin B resistance (such resistance has been correlated with addition of aminoarabinose on the 4' phosphate of lipid A). These genes/loci could be pmrE that encodes a UDP-glucose dehydrogenase, or a region of antimicrobial peptide-resistance genes common to many enterobacteriaciae which could be involved in aminoarabinose synthesis and transfer. The gene pmrF that is present in this region encodes a dolicol-phosphate manosyl transferase (Gunn J. S., Kheng, B. L., Krueger J., Kim K., Guo L., Hackett M., Miller S. I. 1998. Mol. Microbiol. 27: 1171-1182).

Mutations in the PhoP-PhoQ regulatory system, which is a phospho-relay two component regulatory system (e.g., PhoP constitutive phenotype, PhoPc), or low $Mg^{++}$ environmental or culture conditions (that activate the PhoP-PhoQ regulatory system) lead to the addition of aminoarabinose on the 4'-phosphate and 2-hydroxymyristate replacing myristate (hydroxylation of myristate). This modified lipid A displays reduced ability to stimulate E-selectin expression by human endothelial cells and TNF secretion from human monocytes.

Polymyxin B resistant strains are also suitable for use, as such strains have been shown to have reduced LPS toxicity (see, e.g., van der Ley et al. (1994) In: Proceedings of the ninth international pathogenic *Neisseria* conference. The Guildhall, Winchester, England). Alternatively, synthetic peptides that mimic the binding activity of polymyxin B may be added to the antigenic compositions to reduce LPS toxic activity (see, e.g., Rustici et al. (1993) Science 259: 361-365; Porro et al. (1998) Prog Clin Biol Res.397:315-25).

Endotoxin can also be reduced through selection of culture conditions. For example, culturing the strain in a growth medium containing 0.1 mg-100 mg of aminoarabinose per liter medium provides for reduced lipid toxicity (see, e.g., WO 02/097646).

Compositions and Formulations

"Compositions", "antigen composition", "antigenic composition" or "immunogenic composition" is used herein as a matter of convenience to refer generically to compositions comprising a subject NspA as disclosed herein, which subject NspA may be optionally conjugated to further enhance immunogenicity. Compositions useful for eliciting antibodies, e.g., antibodies against *N. meningitidis*, e.g., bactericidal antibodies to *N. meningitidis*, in a human are specifically contemplated by the present disclosure. Antigenic compositions can contain 1, 2, or more different subject NspAs. Where there is more than one type of NspA, each subject NspAs may present epitopes from different combinations of NspA variants derived from different strains of *N. meningitidis*.

Antigenic compositions contain an immunologically effective amount of a subject NspA, and may further include other compatible components, as needed. Compositions of the present disclosure can contain NspA that are low FH binders. The composition contain one or more NspA, in which at least one NspA is a low FH binder. Where there is more than one NspA in a composition, each NspA may be different (e.g. in amino acid sequences and/or conjugation).

In some cases, an antigenic composition of the present disclosure comprises only one NspA variant of the present disclosure. In some cases, an antigenic composition of the present disclosure comprises two or more different NspA variants of the present disclosure.

By "immunologically effective amount" is meant that the administration of that amount to an individual, either in a single dose, as part of a series of the same or different antigenic compositions, is effective to elicit an antibody response effective for treatment or prevention of a symptom of, or disease caused by, for example, infection by *Neisseria*, particularly *N. meningitidis*, more particularly Group B *N. meningitidis*. This amount varies depending upon the health and physical condition of the individual to be treated, age, the capacity of the individual's immune system to produce antibodies, the degree of protection desired, the formulation of the vaccine, the treating clinician's assessment of the medical situation, and other relevant factors. It is expected that the amount will fall in a relatively broad range that can be determined through routine trials.

In some cases, the NspA polypeptide lacks a signal sequence; in other cases (e.g., for expression in a host cell), the NspA polypeptide includes a signal sequence.

Dosage regimen may be a single dose schedule or a multiple dose schedule (e.g., including booster doses) with a unit dosage form of the antigenic composition administered at different times. The term "unit dosage form," as used herein, refers to physically discrete units suitable as unitary dosages for human and animal subjects, each unit containing a predetermined quantity of the antigenic compositions of the present disclosure in an amount sufficient to produce the desired effect, which compositions are provided in association with a pharmaceutically acceptable excipient (e.g., pharmaceutically acceptable diluent, carrier or vehicle). The antigenic composition may be administered in conjunction with other immunoregulatory agents.

Antigenic compositions can be provided in a pharmaceutically acceptable excipient, which can be a solution such as a sterile aqueous solution, often a saline solution, or they can be provided in powder form. Such excipients can be substantially inert, if desired.

In some embodiments, a subject immunogenic composition comprises a subject NspA present in vesicles. In some embodiments, a subject immunogenic composition comprises a subject NspA present in MVs. In some embodiments, a subject immunogenic composition comprises a subject NspA present in OMVs. In some embodiments, a subject immunogenic composition comprises a mixture of MVs and OMVs comprising a subject NspA. Vesicles, such as MVs and OMVs, are described above. In certain embodiments, a subject immunogenic composition comprises a subject NspA present in vesicles prepared from an *E. coli* genetically modified to express the subject NspA. In certain embodiments, the vesicles prepared from the *E. coli* may be OMVs.

The antigenic compositions can further contain an adjuvant. Examples of known suitable adjuvants that can be used in humans include, but are not necessarily limited to, an aluminum adjuvant (e.g., aluminum phosphate, or aluminum hydroxide), MF59 (4.3% w/v squalene, 0.5% w/v Tween 80™, 0.5% w/v Span 85), a CpG-containing nucleic acid (where the cytosine is unmethylated), QS21, MPL, 3DMPL, extracts from Aquilla, ISCOMS, LT/CT mutants, poly(D,L-lactide-co-glycolide) (PLG) microparticles, Quil A, interleukins, and the like. For experimental animals, one can use Freund's adjuvant (incomplete Freund's adjuvant; complete Freund's adjuvant), N-acetyl-muramyl-L-threonyl-D-isoglutamine (thr-MDP), N-acetyl-nor-muramyl-L-alanyl-D-isoglutamine (CGP 11637, referred to as nor-MDP), N-acetylmuramyl-L-alanyl-D-isoglutaminyl-L-alanine-2-(1'-2'-dip-almitoyl-sn-glycero-3-hydroxyphosphoryloxy)-ethylamine (CGP 19835A, referred to as MTP-PE), and RIBI, which contains three components extracted from bacteria, monophosphoryl lipid A, trehalose dimycolate and cell wall skeleton (MPL+TDM+CWS) in a 2% squalene/Tween 80 emulsion. The effectiveness of an adjuvant may be determined by measuring the amount of antibodies directed against the immunogenic antigen or antigenic epitope thereof.

Further exemplary adjuvants to enhance effectiveness of the composition include, but are not limited to: (1) oil-in-water emulsion formulations (with or without other specific immunostimulating agents such as muramyl peptides (see below) or bacterial cell wall components), such as for example (a) MF59 (WO 90/14837; Chapter 10 in Vaccine design: the subunit and adjuvant approach, eds. Powell & Newman, Plenum Press 1995), containing 5% Squalene, 0.5% Tween 80, and Span 85 (optionally containing MTP-PE) formulated into submicron particles using a microfluidizer, (b) SAF, containing 10% Squalane, 0.4% Tween 80, 5% pluronic-blocked polymer L121, and thr-MDP either microfluidized into a submicron emulsion or vortexed to generate a larger particle size emulsion, and (c) RIBI adjuvant system (RAS), (Ribi Immunochem, Hamilton, Mont.) containing 2% Squalene, 0.2% Tween 80, and one or more bacterial cell wall components such as monophosphorylipid A (MPL), trehalose dimycolate (TDM), and cell wall skeleton (CWS), e.g., MPL+CWS (Detox TM); (2) saponin adjuvants, such as QS21 or Stimulon™ (Cambridge Bioscience, Worcester, Mass.) may be used or particles generated therefrom such as ISCOMs (immunostimulating complexes), which ISCOMS may be devoid of additional detergent e.g. WO 00/07621; (3) Complete Freund's Adjuvant (CFA) or Incomplete Freund's Adjuvant (IFA); (4) cytokines, such as interleukins (e.g. IL-1, IL-2, IL-4, IL-5, IL-6, IL-7, IL-12 (WO99/44636), etc.), interferons (e.g. gamma interferon), macrophage colony stimulating factor (M-CSF), tumor necrosis factor (TNF), etc.; (5) monophosphoryl lipid A (MPL) or 3-O-deacylated MPL (3dMPL) e.g. GB-2220221, EP-A-0689454, optionally in the substantial absence of alum when used with pneumococcal saccharides e.g. WO 00/56358; (6) combinations of 3dMPL with, for example, QS21 and/or oil-in-water emulsions e.g. EP-A-0835318, EP-A-0735898, EP-A-0761231; (7) oligonucleotides comprising CpG motifs (see, e.g., WO 98/52581), e.g., an oligonucleotide containing at least one CG dinucleotide, where the cytosine is unmethylated; (8) a polyoxyethylene ether or a polyoxyethylene ester (see, e.g. WO 99/52549); (9) a polyoxyethylene sorbitan ester surfactant in combination with an octoxynol (WO 01/21207) or a polyoxyethylene alkyl ether or ester surfactant in combination with at least one additional non-ionic surfactant such as an octoxynol (WO 01/21152); (10) a saponin and an immunostimulatory oligonucleotide (e.g. a CpG oligonucleotide) (WO 00/62800); (11) an immunostimulant and a particle of metal salt e.g. WO 00/23105; (12) a saponin and an oil-in-water emulsion e.g. WO 99/11241; (13) a saponin (e.g. QS21)+3dMPL+IM2 (optionally+a sterol) e.g. WO 98/57659; (14) other substances that act as immunostimulating agents to enhance the efficacy of the composition. Muramyl peptides include N-acetyl-muramyl-L-threonyl-D-isoglutamine (thr-MDP), N-25 acetyl-normuramyl-L-alanyl-D-isoglutamine (nor-MDP), N-acetylmuramyl-L-alanyl-D-isoglutarninyl-L-alanine-2-(1'-2'-dipalmitoyl--sn-glycero-3-hydroxyphosphoryloxy)-ethylamine MTP-PE), etc. Adjuvants suitable for administration to a human are of particular interest. In some cases, the adjuvant is an aluminum salt adjuvant (e.g., aluminum phosphate or aluminum hydroxide).

The antigen compositions may contain other components, such as pharmaceutical grades of mannitol, lactose, starch, magnesium stearate, sodium saccharin, talcum, cellulose, glucose, sucrose, magnesium, carbonate, and the like. The compositions may contain pharmaceutically acceptable auxiliary substances as required to approximate physiological conditions such as pH adjusting and buffering agents, toxicity adjusting agents and the like, for example, sodium acetate, sodium chloride, potassium chloride, calcium chloride, sodium lactate and the like.

The concentration of the subject NspA in a formulation can vary widely (e.g., from less than about 0.1%, e.g., at or at least about 2% to as much as 20% to 50% or more by weight) and will usually be selected primarily based on fluid volumes, viscosities, and patient-based factors in accordance with the particular mode of administration selected and the patient's needs.

The NspA-containing formulations can be provided in the form of a solution, suspension, tablet, pill, capsule, powder, gel, cream, lotion, ointment, aerosol or the like. It is recognized that oral administration can require protection of the compositions from digestion. This is typically accomplished either by association of the composition with an agent that renders it resistant to acidic and enzymatic hydrolysis or by packaging the composition in an appropriately resistant carrier. Means of protecting from digestion are well known in the art.

The NspA-containing formulations can also be provided so as to enhance serum half-life of NspA following administration. For example, where isolated NspAs are formulated for injection, the NspA may be provided in a liposome formulation, prepared as a colloid, or other conventional techniques for extending serum half-life. A variety of methods are available for preparing liposomes, as described in, e.g., Szoka et al., Ann. Rev. Biophys. Bioeng. 9:467 (1980), U.S. Pat. Nos. 4,235,871, 4,501,728 and 4,837,028. The preparations may also be provided in controlled release or slow-release forms.

Methods of Inducing an Immune Response

The present disclosure provides a method of inducing an immune response to at least one Neisserial strain in a mammalian host. The methods generally involve administering to an individual in need thereof an effective amount of a subject immunogenic composition.

The NspA-containing antigenic compositions are generally administered to a human subject that is at risk of acquiring a Neisserial disease so as to prevent or at least partially arrest the development of disease and its complications. An amount adequate to accomplish this is defined as a "therapeutically effective dose." Amounts effective for therapeutic use will depend on, e.g., the antigenic composition, the manner of administration, the weight and general state of health of the patient, and the judgment of the prescribing physician. Single or multiple doses of the antigenic compositions may be administered depending on the dosage and frequency required and tolerated by the patient, and route of administration.

The NspA-containing antigenic compositions are generally administered in an amount effective to elicit an immune response, particularly a humoral immune response, e.g., a bactericidal antibody response, in the host. As noted above, amounts for immunization will vary, and can generally range from about 1 µg to 100 µg per 70 kg patient, usually 5 µg to 50 µg/70 kg. Substantially higher dosages (e.g. 10 mg to 100 mg or more) may be suitable in oral, nasal, or topical administration routes. The initial administration can be followed by booster immunization of the same of different NspA-containing antigenic composition. Vaccination in some cases involves at least one booster, and in some cases two boosters.

In general immunization can be accomplished by administration by any suitable route, including administration of the composition orally, nasally, nasopharyngeally, parenterally, enterically, gastrically, topically, transdermally, subcutaneously, intramuscularly, in tablet, solid, powdered, liquid, aerosol form, locally or systemically, with or without added excipients. Actual methods for preparing parenterally administrable compositions will be known or apparent to those skilled in the art and are described in more detail in such publications as Remington's Pharmaceutical Science, 15th ed., Mack Publishing Company, Easton, Pa. (1980).

An anti-NspA immune response can be assessed by known methods (e.g. by obtaining serum from the individual before and after the initial immunization, and demonstrating a change in the individual's immune status, for example an immunoprecipitation assay, an ELISA, or a bactericidal assay, a Western blot assay, or flow cytometric assay, or the like).

Whether a variant NspA of the present disclosure elicits a bactericidal response to one or more strains of *N. meningitidis* in a mammalian host can be determined using any well-known assay. For example, a human FH transgenic mouse can be used, where the mouse expresses human FH (e.g., human FH is present in serum of the mouse at a concentration of about 100 μg/ml or greater than 100 μg/ml). A variant NspA of the present disclosure is administered to the human FH transgenic mouse. After a period of time, serum from the mouse is tested for bactericidal activity against one or more strains of *N. meningitidis.*

The antigenic compositions can be administered to a mammalian host (e.g., a human subject) that is immunologically naive with respect to *N. meningitidis*. In a particular embodiment, the subject is a human child about five years or younger, and preferably about two years old or younger, and the antigenic compositions are administered at any one or more of the following times: two weeks, one month, 2, 3, 4, 5, 6, 7, 8, 9, 10, or 11 months, or one year or 15, 18, or 21 months after birth, or at 2, 3, 4, or 5 years of age.

It may be generally desirable to initiate immunization prior to the first sign of disease symptoms, or at the first sign of possible or actual exposure to infection or disease (e.g., due to exposure or infection by *Neisseria*).

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Celsius, and pressure is at or near atmospheric. Standard abbreviations may be used, e.g., bp, base pair(s); kb, kilobase(s); pl, picoliter(s); s or sec, second(s); min, minute(s); h or hr, hour(s); aa, amino acid(s); kb, kilobase(s); bp, base pair(s); nt, nucleotide(s); i.m., intramuscular(ly); i.p., intraperitoneal (ly); s.c., subcutaneous(ly); and the like.

Example 1: Generation of NspA Site-Directed Mutants (SDMs) with Decreased Ability to Bind Human Factor H Previous vaccination studies in factor H (FH) transgenic mice using NspA as antigen and comparing antibody responses to wild type mice implied that the binding of human FH to NspA could have led to its decreased immunogenicity (Lujan et al, 2016). This study led to the proposition that NspA protein with mutations in FH binding domain could serve as a better antigen through induction of protective bactericidal antibodies against *N. meningitidis*. To investigate this further, we generated point mutants of wild type NspA gene from serogroup W strain Sudan 1/06 (Su 1/06) cloned into plasmid vector, pUC19 (pEHNspA) (Lujan et al, 2016) and expressed them in *Escherichia coli* BL21 (DE3). We then tested the ability of these *E. coli* strains expressing mutant NspA protein to bind FH by whole bacterial cell ELISA.

NspA is a 16.5 kDA beta-barrel protein with four external and four internal loops (Vandeputte-Rutten et al, 2003). From the NspA crystal structure and previous studies, we know that the amino acid residues in external loops especially loop 3 are important for binding FH ((Lewis et al, 2019; Vandeputte-Rutten et al, 2003)). Anti-NspA mouse monoclonal antibodies, AL-12 and 14C7 were shown to bind the external loops 2 and 3 (Hou et al, 2003). We were interested in mutating amino acid residues in the external loops and testing these mutant proteins for their ability to bind FH and to induce protective bactericidal antibodies against *N. meningitidis*. Based on the studies done on FH binding protein (fHbp) of *N. meningitidis*, (Schneider et al, Nature 2009; Beernink et al, J Immunol 2011; Pajon et al, 2012), we hypothesized that charged residues in NspA would be required for binding FH. To this end, we generated single point mutants of charged residues in all of the external loops of NspA. We identified 10 different charged residues in the external loops of NspA, which also included previously known aspartic acid residue at position 113, being important for binding factor H ((Lewis et al, 2019), FIG. 1).

The charged residues in the external loops were singly mutated to alanine residue using NEB (New England Biolabs) Q5 Site-directed mutagenesis kit. Based on the kit instructions, inverse PCR products with mutations at the required residues were generated using pEHNspA plasmid (Lujan et al, Infect Immun 2016) as the template. KLD (Kinase, Ligase, DpnI treatment) reactions were set up as per kit instructions. The mutated and religated products were transformed into *E. coli* NEB 5a competent cells and grown on LB (Luria-Bertani) plates containing 50 µg/mL of ampicillin. Plasmids were prepared from at least four different transformants for each mutation and the presence of mutations in the desired residues were confirmed by DNA sequence analysis.

For each mutation, two of the sequenced plasmids were transformed into expression strain, *E. coli* BL-21 (DE3). NspA protein expression was confirmed by SDS-PAGE and western blot analysis of bacterial cell lysates and concentrated cell cultures supernatants. *E. coli* BL21(DE3) with pEHNspA plasmid expressing WT NspA or empty vector pUC19 were used as positive and negative control respectively in all studies. *E. coli* BL21(DE3) strains were grown in 6 mL of LB broth containing ampicillin 50 µg/mL at 37° C. for about 17 hours at 200 rpm. The cultures were centrifuged at 4000×g for 10 minutes at room temperature (RT) to pellet bacterial cells and were washed once and resuspended in 600 µL of Phosphate buffered saline (PBS). The culture supernatants were concentrated 10 times and the resuspended bacterial pellets were lysed in 4× NuPAGE LDS (Lithium dodecyl sulphate) sample buffer (Invitrogen) with 2.5% SDS (Sodium dodecyl sulphate) at 95° C. for 12 minutes. The prepared bacterial cell lysates and culture supernatants were run on 4-12% SDS-PAGE bis-tris gel (Invitrogen) at 200 V for 45 minutes in NuPAGE MES (2-(N-morpholino) ethanesulfonic acid) SDS running buffer (Invitrogen). The gels were stained with SimplyBlue safe stain (Invitrogen) as per manufacturer's instructions and destained in deionized water. For western blot analysis, the proteins run on 4-12% SDS-PAGE bis-tris gels were transferred to PVDF membranes at 30 V for one hour using X Cell IITM blot module. The membranes were blocked overnight in 5% skimmed milk in PBS at 4° C. The blocked blots were incubated with anti-NspA polyclonal antibody or monoclonal antibodies, AL-12 or 14C7, for two hours at RT. The bound primary antibodies were detected by incubating blots with goat anti-mouse IRDye 800 antibody for one hour at RT. Between each incubation step, the membranes were washed thrice in PBST (PBS+0.1% Tween-20). The blots were imaged at 800 nm on an infrared imager (Li-Cor Odyssey).

Results

NspA protein expression was detected in both bacterial cell lysates and culture supernatants on SDS-PAGE gels and western blots probed with anti-NspA polyclonal antibody for all NspA mutants (FIG. 2). As NspA is a heat modifiable protein, it was detected as three different sized bands on the gel: 14, 16 and 18 kDa.

FIG. 1. NspA amino acid sequence. Shown is the amino acid sequence of NspA protein from *N. meningitidis* serogroup W strain Sudan 1/06 (Su 1/06). The amino acids depicted within boxes where mutated individually to alanine in the studies.

FIG. 2. SDS-PAGE and western blot analysis of site-directed mutants (SDMs) of NspA protein expressed in *E. coli* BL21(DE3). Bacterial cell lysates (a.1) and concentrated culture supernatants (a.2) of *E. coli* BL-21 (DE3) expressing wild-type (WT) or SDM NspA proteins were run in 4-12% SDS-PAGE bis-tris gels, stained with SimplyBlue safe stain and imaged in infra-red imager. Bacterial cell lysates of *E. coli* BL21(DE3) expressing WT or SDM NspA proteins were run in 4-12% SDS-PAGE gels, transferred to PVDF membranes and probed with anti-NspA, mouse polyclonal antibody (pAb) (b.1) or mouse monoclonal antibodies (mAb), AL-12 (b.2) or 14C7 (b.3). Shown are the blots images captured using an infrared imager.

Lanes, M—Bio-Rad Precision Plus prestained dual color protein standard, NC— negative control (pUC19 vector), PC—positive control (WT NspA), 1-10—SDMs of NspA: 1-L1-K44A, 2—L2-K72A, 3—L2-D77A, 4—L2-K79A, 5—L3-R109A, 6—L3-D113A, 7—L3-D118A, 8—L4-K154A, 9—L4-K159A, 10—L4-R162A, MM-Invitrogen MagicMark XP western protein standard. L1 to L4 described above refers to the external loops 1~4 of NspA protein and the alphabets and numbers in the description corresponds to the amino acids and their positions in the NspA protein sequence.

The arrows point to the three different forms of NspA protein detected in stained SDS-PAGE gels and western blots.

Example 2: Whole Bacterial Cell ELISA for Identification of NspA SDMs with Decreased Ability to Bind Human Factor H

*E. coli* BL21(DE3) strains expressing mutated NspA proteins were screened by whole bacterial cell ELISA for identification of mutants with decreased ability to bind human factor H. Nunc flat-bottom 96-well plates coated with poly-L-lysine was used for this assay. As described earlier, *E. coli* BL21(DE3) strains expressing wild type and mutant NspA proteins were grown in 6 mL of LB broth containing ampicillin 50µ g/mL at 37° C. for about 17 hours at 200 rpm. The cultures were centrifuged at 4000×g for 10 minutes at RT to pellet bacterial cells and were washed once and resuspended in PBS. Absorbance at 600 nm was measured for all resuspended cultures and adjusted to the negative control value to ensure a consistent cell density for subsequent ELISA experiments. These cultures were diluted further (1 in 10 dilution) and used for coating ELISA plates.

ELISA plates were coated with 0.1 mg/L of poly-L-lysine (50 µ/well) for 30 minutes at RT. The coated plates were washed three times in deionised water and air dried for 2 hours at RT. The poly-L-lysine coated plates were incubated with 100µ of prepared recombinant *E. coli* cultures overnight at 4° C. Next day, the coated plates were washed thrice in PBST and blocked in a solution containing 1% skimmed milk and 2% BSA in PBST at RT for one hour and thirty minutes. The blocked plates were incubated with FH for two hours at RT with gentle agitation. The bound FH were detected with sheep anti-human FH antibody (1 in 7,000 dilution) which was detected with donkey anti-sheep IgG antibody conjugated to alkaline phosphatate (AP) (1 in 10,000 dilution). The incubation with antibodies were done at RT with gentle agitation for one hour. Between each incubation step, the plates were washed thrice in PBST. AP substrate (para-nitrophenyl phosphate; 1 mg/ml) was added to the plates, incubated at RT for 30 minutes and absorbance was read at 405 nm in an ELISA plate reader.

In parallel, ELISA was also done with polyclonal and monoclonal anti-NspA antibodies. The plates coated with bacterial cells were washed thrice in PBT and blocked in 5% skimmed milk in PBS at RT for one hour and thirty minutes. The blocked plates were incubated with anti-NspA polyclonal or monoclonal, AL-12 antibody for two hours. The bound primary antibodies were detected by incubating plates with goat anti-mouse IgG-AP antibody for one hour. The incubation with antibodies were done at RT with gentle agitation. Between each incubation step, the plates were washed thrice in PBST. AP substrate was added to the plates, incubated at RT for 30 minutes and absorbance was read at 405 nm in an ELISA plate reader.

Results

NspA mutants in loop 3 at position 113 (L3-D113A) and position 118 (L3-D118 A) showed visibly low binding to monoclonal antibodies, AL-12 and 14C7. These mutants showed low binding to AL-12 antibody in whole bacterial cell ELISA also (FIGS. 3 and 4).

In FH ELISA using rat recombinant Human FH, wild type NspA yielded a mean absorbance value of 2.46 (FIG. 2) which is an indirect measurement of FH binding to NspA. Most of the mutants yielded an absorbance value above 2.0. Loop 3 mutant, L3-D118A had the lowest mean absorbance value like negative control indicating low binding to FH (FIG. 2). Another loop 3 mutant, L3-D113A mutant yielded the second lowest absorbance value (FIG. 2). Rat recombinant Human FH is human FH expressed by a transgenic rat.

To investigate this further, we conducted a FH titration ELISA using purified Human factor H obtained from human serum. NspA loop 3 mutants, L3-D113A and L3-D118A and two other mutants in loop 2 at residues 72 and 77, L2-K72A and L2-D77A respectively, were investigated further along with positive and negative controls (FIG. 4). In these ELISAs, both loop 3 mutants and loop 2 mutant L2-D77A showed low binding to FH at all concentrations (FIG. 4). Loop 2 mutant L2-K72 A had a factor H titration curve like wild type NspA (FIG. 4). This study indicates that loop 3 mutants, L3-D113A and L3-D118A and loop 2 mutant, L2-D77A would be good vaccine candidates.

Figure 3:
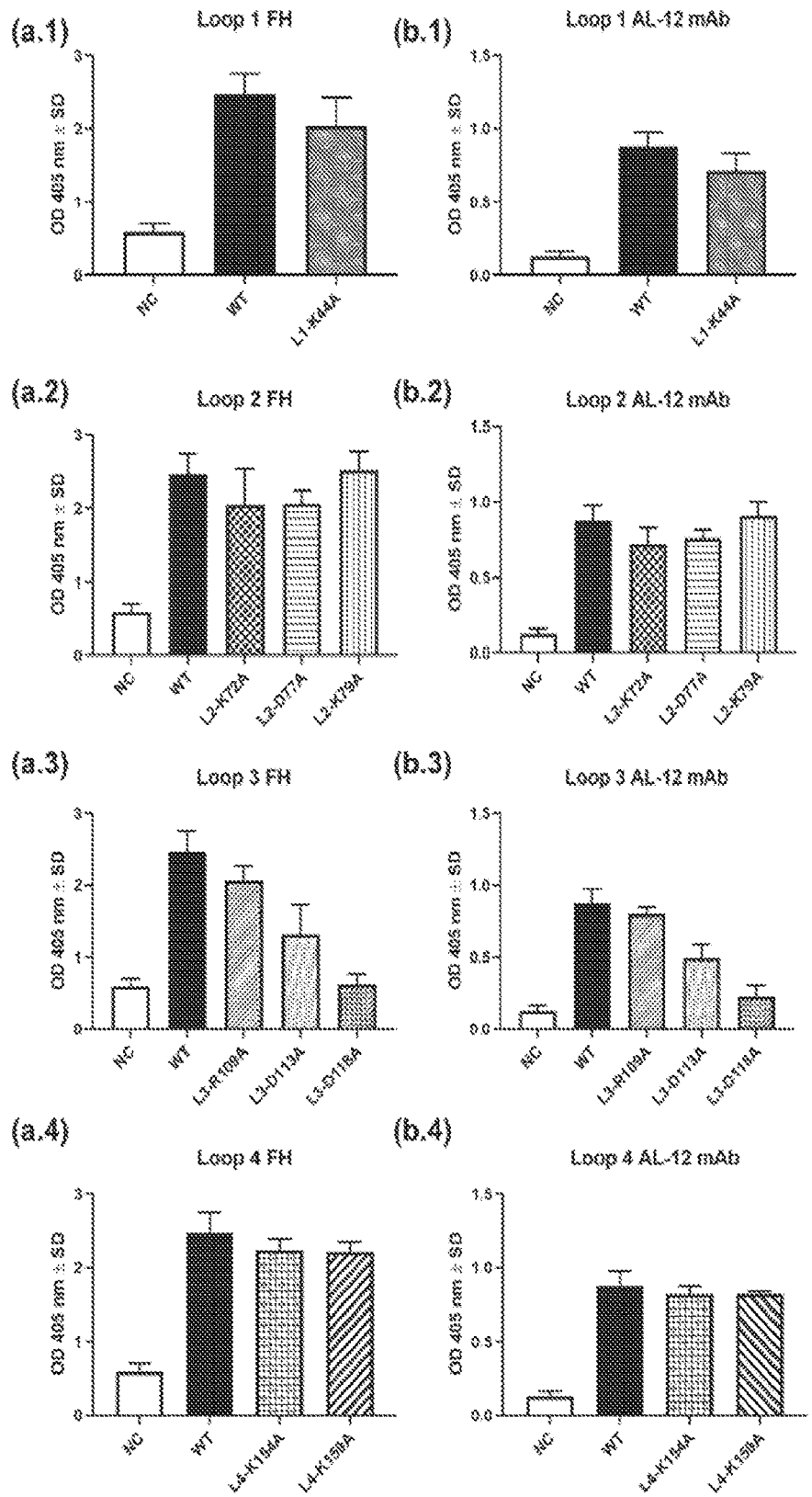
FIG. 3. Binding of NspA SDMs to purified Rat recombinant Human factor H (FH) protein.
Figure 4:
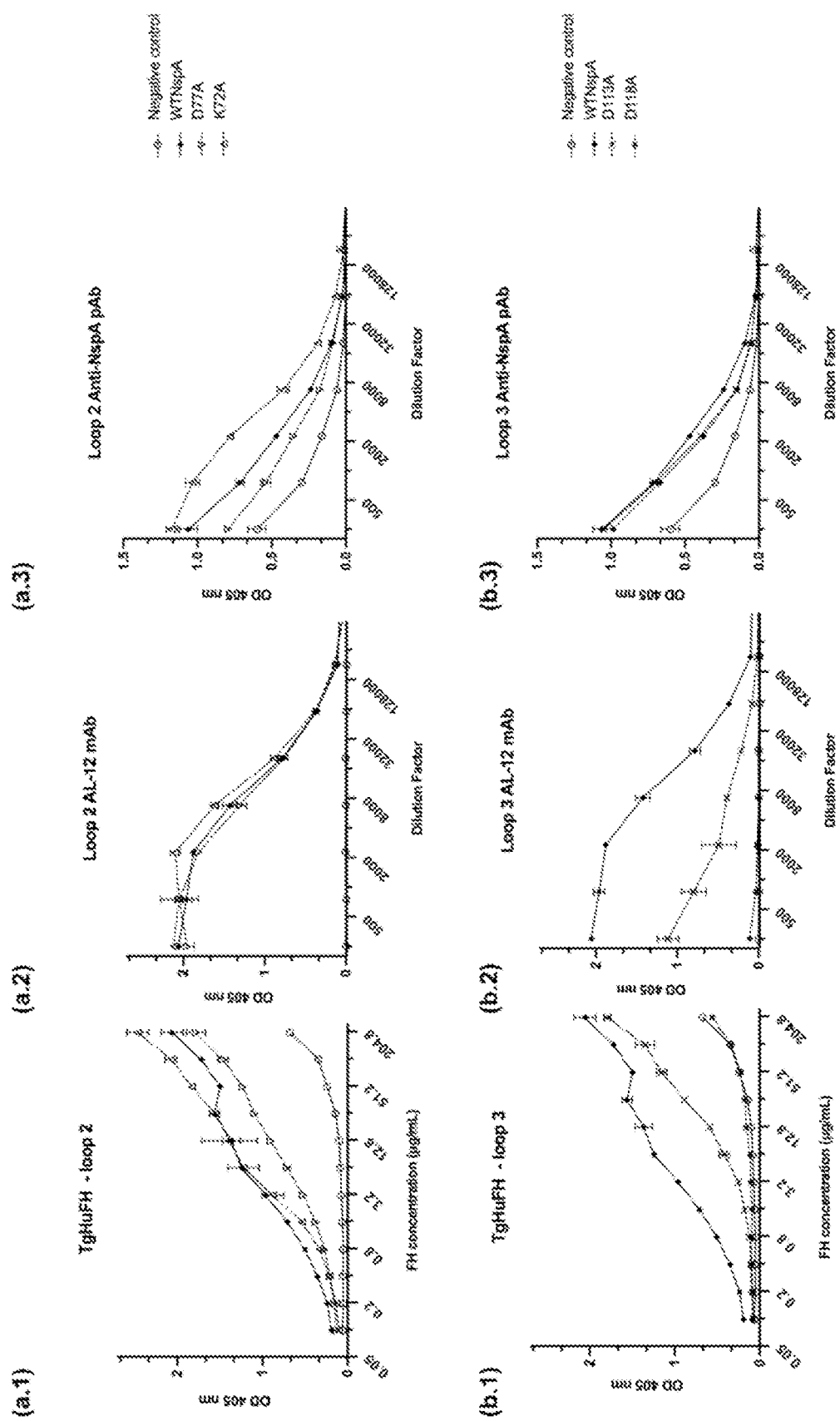
FIG. 4. Binding of NspA SDMs in loop 2 and 3 to purified Rat recombinant Human factor H (FH) protein.

FIG. 3. Study of the binding of NspA SDMs to factor H (FH) protein using Rat recombinant Human FH by whole bacterial cell ELISA. Purified Rat recombinant Human FH (20 µg/mL) (a) or anti-NspA monoclonal antibody, AL-12 (3 µg/mL) was added to ELISA plates coated with *E. coli* BL21(DE3) bacterial cells expressing wild-type (WT) or SDM NspA proteins. The bound FH or AL-12 was detected with sheep anti-FH antibody and Donkey anti-sheep IgG-AP or goat anti-mouse IgG-AP antibodies, respectively. Shown are the bar charts of mean absorbance data measured at 405 nm from two separate experiments set up in triplicates, for SDMs in different loops of NspA protein, loop 1 (a.1, b.1), loop 2 (a.2, b.2), loop 3 (a.3, b.3) and loop 4 (a.4 and b.4).

FIG. 4. Study of the binding of NspA SDMs in loops 2 and 3 to FH using purified Rat recombinant Human FH by whole bacterial cell ELISA. Two-fold serial dilutions of Human FH purified from transgenic rat sera (a.1, b.1) or three-fold serial dilutions of monoclonal antibody, AL-12 (a.2, b.2) or anti-NspA polyclonal antibody (a.3, b.3) were added in duplicates to ELISA plates coated with *E. coli* BL-21 (DE3) bacterial cells expressing wild-type (WT) or SDM NspA proteins. The bound FH or anti-NspA antibodies were detected with sheep anti-FH (1:7000 dilution) and donkey anti-sheep-AP (1:10000 dilution) or goat anti-mouse AP antibodies (1:5000 dilution), respectively. Shown are the line graphs of mean absorbance data measured at 405 nm from an experiment set up in duplicates, for SDMs in loop 2 (a.1, b.1, c.1) and 3 (a.2, b.2, c.2) of NspA protein.

Example 3: *E. coli* OMV Characterization and Immunization

Figure 5:
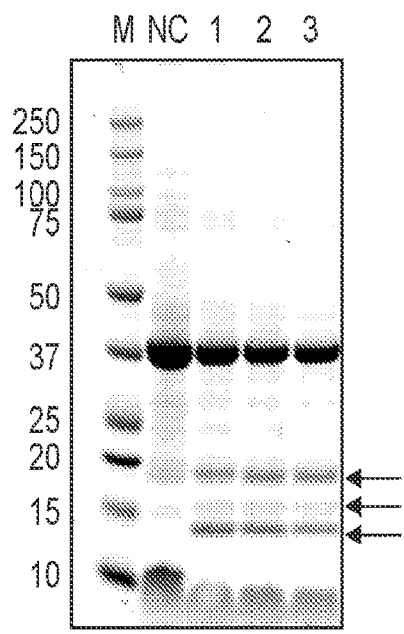
FIG. 5—Validation of purified *E. coli* OMVs expressing WT or mutant NspA proteins by SDS-PAGE, Western blot analysis and binding ELISAs.
Figure 5:
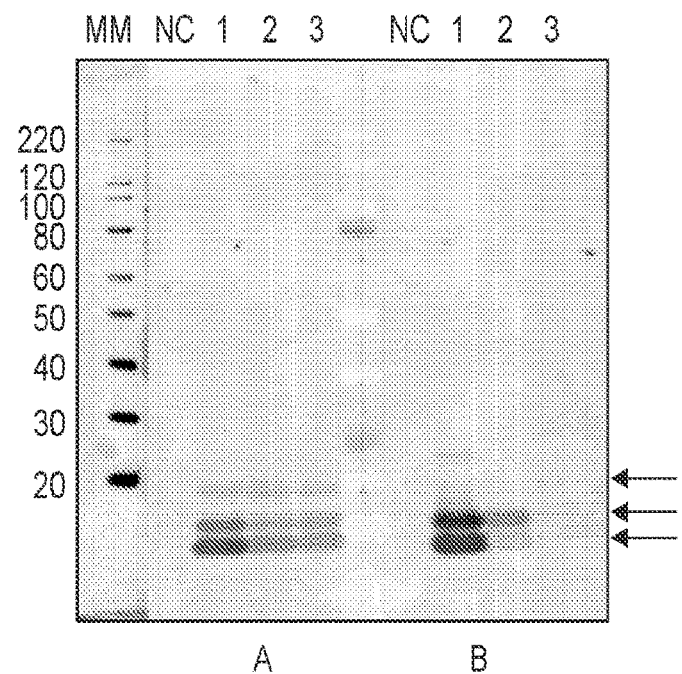
Figure 5:
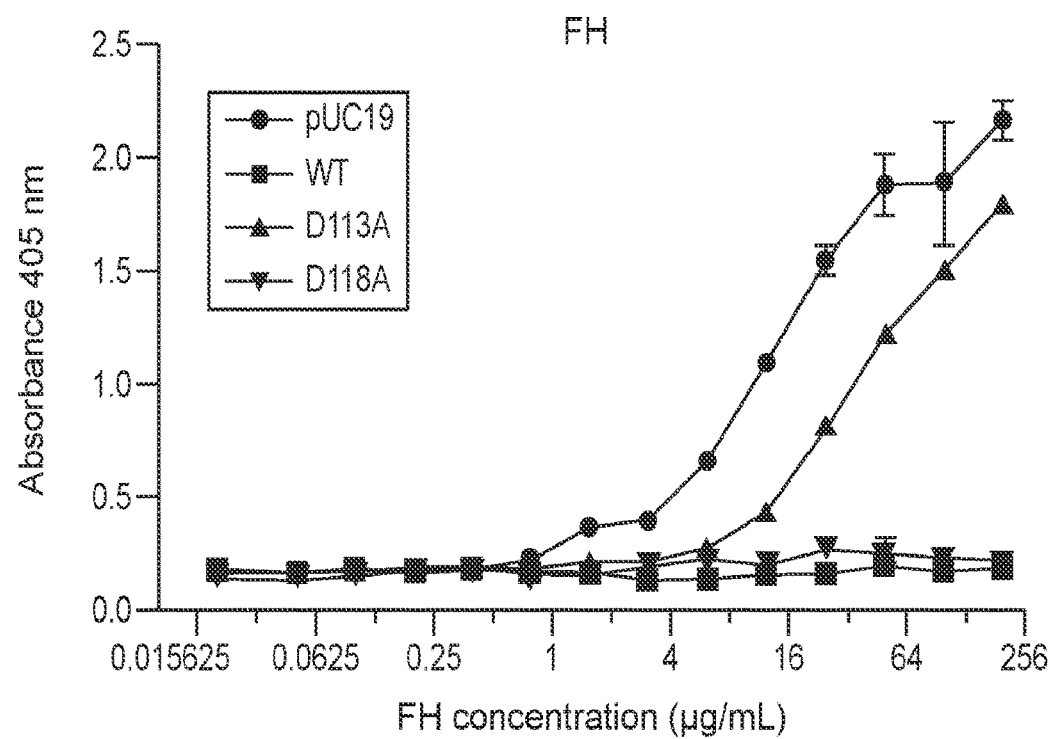
Figure 5:
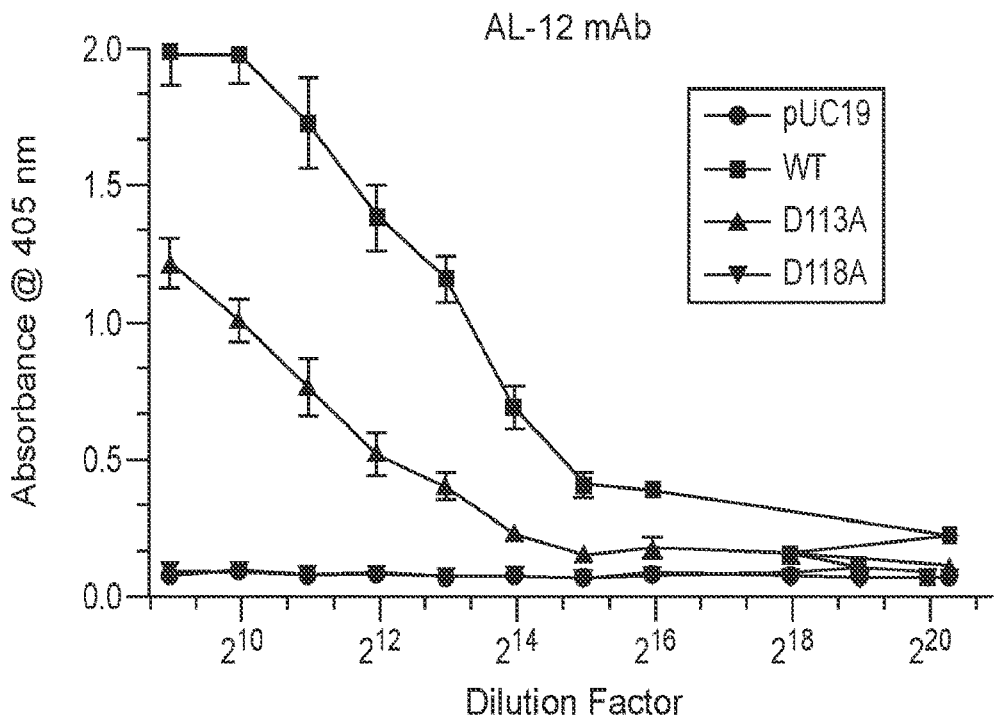
Figure 5:
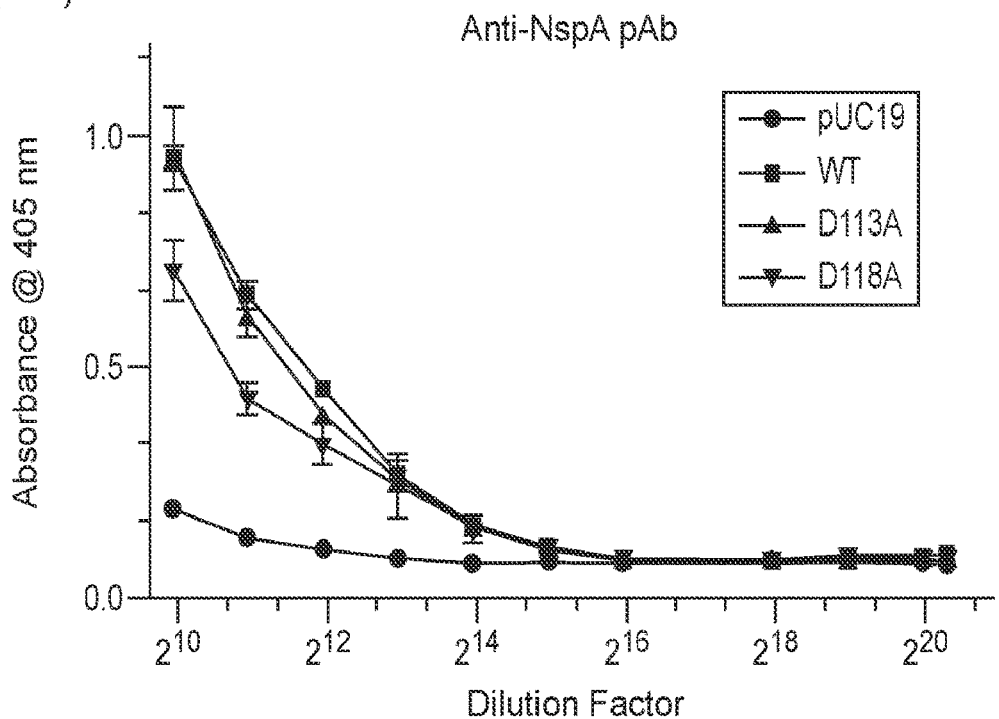

FIG. 5. Validation of purified *E. coli* OMVs expressing WT and mutant NspA proteins by SDS-PAGE, Western blot analysis and binding ELISAs. (a.1) Purified *E. coli* OMVs (3 µg/lane) were run on 4-12% SDS-PAGE bis-tris gels, stained with Coomassie blue stain and imaged using an infra-red imager. (a.2) Purified *E. coli* OMVs (0.75 μg/lane) were run on 4-12% SDS-PAGE gels, transferred to PVDF membranes and probed with anti-NspA, mouse polyclonal antibody (pAb, 1:5000 dilution) (A) or mouse monoclonal antibodies (mAb, 1:2500 dilution), AL-12 (B). Shown are the blots images captured using an infra-red imager. Lanes, M—Biorad prestained dual color protein standard, MM-Invitrogen MagicMark XP western protein standard, NC— negative control (pUC19 vector), 1—WTNspA OMV, 2—D113A OMV, 3—D118A OMV. Arrows point to the three different forms of NspA protein detected in stained SDS-PAGE gels and western blots. (b) Two-fold serial dilutions of purified Human FH (Comptech) (b.1) or anti-NspA monoclonal antibody, AL-12 (b.2) or anti-NspA polyclonal antibody (b.3) were added in duplicates to ELISA plates coated with *E. coli* OMVs. Bound FH or Abs were detected with sheep anti-FH (1:7000 dilution) and Donkey anti-sheep-AP (1:10000 dilution) or goat anti-mouse AP antibodies (1:5000 dilution), respectively. Shown are the line graphs of mean absorbance data measured at 405 nm from an experiment set up in duplicates (b.1, b.2, b.3).

Figure 6:
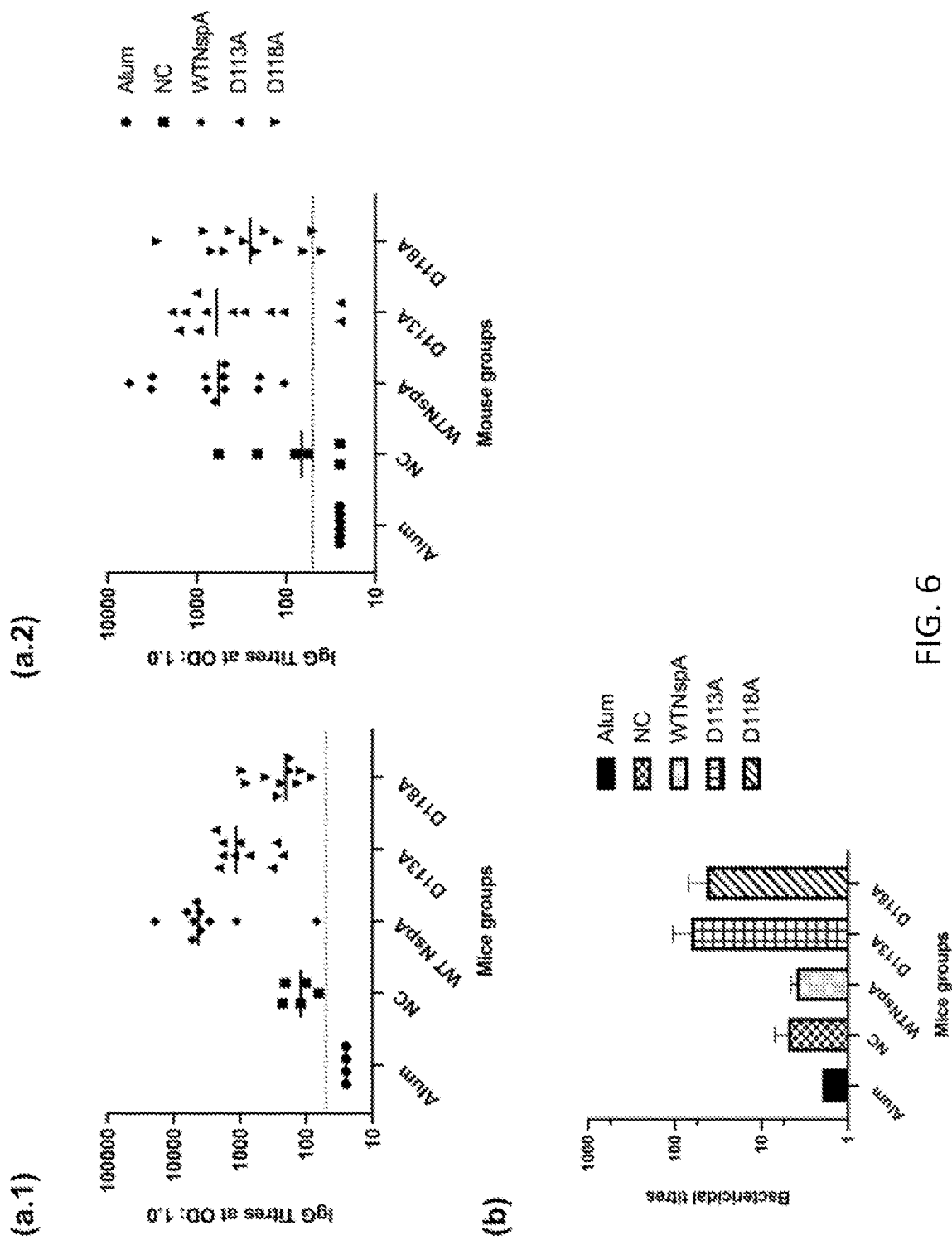
FIG. 6. Analysis of IgG antibody and bactericidal titers of sera collected from mice immunized with OMVs expressing WT or mutant NspA proteins.

FIG. 6—Analysis of IgG antibody and bactericidal titers of sera collected from mice immunized with OMVs expressing WT and mutant NspA proteins. 6-week old WT CD-1 mice and 6-16 week old transgenic mice expressing Human FH were immunized intra-peritoneally with *E. coli* OMVs containing WT or mutant NspA proteins. Three doses of each vaccine, 5 ug per dose were administered with 3-week interval between first and second dose and 2-week interval between second and third dose. Aluminum hydroxide (Alhydrogel®) was used as the adjuvant. Among WT mice, control groups consisted of 5 mice per group and test groups consisted of 10 mice per group. Among human FH transgenic mice, controls groups consisted of 6 mice per group and test groups consisted of 12 mice per group. Blood were collected from all mice two weeks post third dose by cardiac puncture and sera were separated and stored at −80° C.

IgG titers of serum samples were measured by whole bacterial ELISA. Maxisorp ELISA plates were coated overnight at 4° C. with 108 cfu per well of heat-killed *N. meningitidis* 8047 grown to OD 0.8. The plates were washed once and blocked with 1% BSA in PBST (200 μl/well) for 1 hour 30 minutes at RT. Five-fold serial-dilutions of the serum samples in 0.1% BSA in PBST were applied to the blocked and washed ELISA plates (100 μl/well) and incubated at RT with gentle agitation for 2 hours. Goat anti-mouse IgG-AP secondary antibody at 1:5000 dilution was added (100 μl/well) and the plates were incubated at RT with gentle agitation for one hour. ELISA plates were washed three times in PBST after antibody incubation steps. AP substrate, p-nitrophenylphosphate) was added to the plates (1 mg/mL, 100 μl/well), incubated at room temperature for 30 minutes and absorbance was read at 405 nm on an UV/VIS plate reader. IgG titers were assigned for each sera from the titration curves based on an optical density of 1.0.

Shown in FIGS. 6, (a.1) and (a.2) are the IgG titers of the sera from WT and transgenic mice expressing Human FH, immunized intra-peritoneally with *E. coli* OMVs containing WT or mutant NspA proteins. Bars in the graphs correspond to median values and the dotted line represents the limit of detection.

Bactericidal activity of the sera from immunized mice were tested by serum bactericidal assay. A log-phase culture of *N. meningitidis* strain BZ198 grown to and optical density at 620 nm of 0.6 was diluted in 1% BSA-DPBS to a suspension containing 50-100 CFU of bacteria. The bacteria were incubated with 3-fold serial dilutions of pooled mouse sera and a source of human complement (Valley biochemicals) for 1 hour at 37° C., 5% CO2 with gentle rocking. After incubation, the reactions were plated on chocolate agar (10 μl/sample) and incubated at 37° C., overnight. Colonies were counted and bactericidal titers were calculated as the dilution of antibody needed to yield 50% killing, based on the percent survival of bacteria in the presence of test antibody compared to control wells without antibody. Shown in FIG. 6 (*b*) are the bactericidal antibody titers of sera ±standard error from immunized WT mice.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A variant Neisserial surface protein (NspA), wherein the variant NspA comprises an amino acid sequence at least 90% identical to the amino acid sequence of SEQ ID NO: 1 and comprises at least one of:

(a) an amino acid substitution of the lysine (K) at position 72 with an uncharged amino acid or a negatively charged amino acid;

(b) an amino acid substitution of the aspartic acid (D) at position 77 with an uncharged amino acid or a positively charged amino acid;

(c) an amino acid substitution of the aspartic acid (D) at position 113 with an uncharged amino acid or a positively charged amino acid, wherein when the amino acid substitution at position 113 is with histidine, the variant NspA does not comprise a substitution of valine at position 112 with alanine; and (d) an amino acid substitution of the aspartic acid (D) at position 118 with an uncharged amino acid or a positively charged amino acid, wherein the uncharged amino acid comprises: a non-polar side chain and is selected from the group consisting of glycine, alanine, valine, leucine, methionine and isoleucine; a polar side chain and is selected from the group consisting of serine, threonine, cysteine, proline, and glutamine; or a non-polar, aromatic side chain and is selected from the group consisting of phenylalanine, tyrosine, and tryptophan, wherein the amino acid substitutions are relative to the amino acid sequence of SEQ ID NO:1.

2. The variant NspA of claim 1, wherein the variant comprises one or more of (i) an amino acid substitution of the lysine (K) at position 72 with an uncharged amino acid, (ii) an amino acid substitution of the aspartic acid (D) at position 77 with an uncharged amino acid, (iii) an amino acid substitution of the aspartic acid (D) at position 113 with an uncharged amino acid, or (iv) an amino acid substitution of the aspartic acid (D) at position 118 with the uncharged amino acid.

3. The variant NspA of claim 1, wherein the uncharged amino acid comprises a non-polar side chain and is selected from the group consisting of glycine, alanine, valine, leucine, methionine and isoleucine.

4. The variant NspA of claim 1, wherein the uncharged amino acid at position 72, position 77, or position 113 comprises a polar side chain and is selected from the group consisting of serine, threonine, cysteine, proline, asparagine and glutamine.

5. The variant NspA of claim 1, wherein the uncharged amino acid comprises a non-polar, aromatic side chain and is selected from the group consisting of phenylalanine, tyrosine, and tryptophan.

6. The variant NspA of claim 1, wherein the variant NspA does not comprise a substitution of valine at position 112.

7. The variant NspA of claim 1, wherein the amino acid sequence of the variant NspA is at least 95% identical, at least 96% identical, at least 97% identical, at least 98% identical, or at least 99% identical to the amino acid sequence of SEQ ID NO:1.

8. The variant NspA of claim 1, wherein the amino acid sequence of the variant NspA is the amino acid sequence of a *N. meningitidis* (*N. meningitidis*) NspA other than the amino acid substitution.

9. The variant NspA of claim 8, wherein the *N. meningitidis* is a serogroup W strain, a serogroup A strain, a serogroup B strain, a serogroup C strain, a serogroup X strain, or a serogroup Y strain.

10. The variant NspA of claim 9, wherein the N. meningitidis is serogroup W strain Sudan 1/06, serogroup A strain ST-4, serogroup B strain MC58 or NMB-CDC, or serogroup C strain, FAM18.

11. An immunogenic composition comprising:
a) the variant NspA according to claim 1; and
b) a pharmaceutically acceptable excipient.

12. The immunogenic composition of claim 11, wherein the variant NspA is in vesicles prepared from a *N. meningitidis* or a *N. gonorrhoeae* strain or from an *Escherichia coli* (*E. coli*) strain.

13. The immunogenic composition of claim 12, wherein the variant NspA is in outer membrane vesicles (OMVs) prepared from the *E. coli* strain or wherein the variant NspA is in outer membrane vesicles (OMVs) or microvesicles (MVs) prepared from a *N. meningitidis* or a *N. gonorrhoeae* strain.

14. The immunogenic composition of claim 11, wherein said pharmaceutically acceptable excipient comprises an adjuvant.

15. The immunogenic composition of claim 11, further comprising factor H binding protein (fHbp), wherein the fHbp is a naturally occurring fHbp or a variant of a naturally occurring fHbp, which variant has reduced binding affinity for human factor H.

16. The immunogenic composition of claim 14, wherein the adjuvant is aluminum phosphate or aluminum hydroxide.

17. A nucleic acid encoding the variant NspA according to claim 1 or a recombinant expression vector comprising the nucleic acid.

18. An in vitro host cell comprising the nucleic acid or the recombinant expression vector of claim 17.

19. A method of eliciting an antibody response to *Neisseria* in a mammal, the method comprising administering to a mammal the immunogenic composition of claim 11.

20. The method of claim 19, wherein the mammal is a human.

21. The variant NspA of claim 1, wherein the variant comprises an amino acid substitution of the D at position 113 with alanine or wherein the variant comprises an amino acid substitution of the D at position 118 with alanine.

* * * * *

SEQUENCE LISTING

<160> NUMBER OF SEQ ID NOS: 5

<210> SEQ ID NO 1
<211> LENGTH: 174
<212> TYPE: PRT
<213> ORGANISM: Neisseria meningitidis

<400> SEQUENCE: 1

```
Met Lys Lys Ala Leu Ala Thr Leu Ile Ala Leu Ala Leu Pro Ala Ala
1               5                   10                  15

Ala Leu Ala Glu Gly Ala Ser Gly Phe Tyr Val Gln Ala Asp Ala Ala
            20                  25                  30

His Ala Lys Ala Ser Ser Ser Leu Gly Ser Ala Lys Gly Phe Ser Pro
        35                  40                  45

Arg Ile Ser Ala Gly Tyr Arg Ile Asn Asp Leu Arg Phe Ala Val Asp
    50                  55                  60

Tyr Thr Arg Tyr Lys Asn Tyr Lys Ala Pro Ser Thr Asp Phe Lys Leu
```

```
            65                  70                  75                  80

Tyr Ser Ile Gly Ala Ser Ala Ile Tyr Asp Phe Asp Thr Gln Ser Pro
                    85                  90                  95

Val Lys Pro Tyr Leu Gly Ala Arg Leu Ser Leu Asn Arg Ala Ser Val
                   100                 105                 110

Asp Leu Gly Gly Ser Asp Ser Phe Ser Gln Thr Ser Thr Gly Leu Gly
                   115                 120                 125

Val Leu Ala Gly Val Ser Tyr Ala Val Thr Pro Asn Val Asp Leu Asp
                   130                 135                 140

Ala Gly Tyr Arg Tyr Asn Tyr Ile Gly Lys Val Asn Thr Val Lys Asn
145                 150                 155                 160

Val Arg Ser Gly Glu Leu Ser Ala Gly Val Arg Val Lys Phe
                   165                 170

<210> SEQ ID NO 2
<211> LENGTH: 1231
<212> TYPE: PRT
<213> ORGANISM: Homo sapiens

<400> SEQUENCE: 2

Met Arg Leu Leu Ala Lys Ile Ile Cys Leu Met Leu Trp Ala Ile Cys
1               5                   10                  15

Val Ala Glu Asp Cys Asn Glu Leu Pro Pro Arg Arg Asn Thr Glu Ile
                    20                  25                  30

Leu Thr Gly Ser Trp Ser Asp Gln Thr Tyr Pro Glu Gly Thr Gln Ala
                    35                  40                  45

Ile Tyr Lys Cys Arg Pro Gly Tyr Arg Ser Leu Gly Asn Val Ile Met
 50                 55                  60

Val Cys Arg Lys Gly Glu Trp Val Ala Leu Asn Pro Leu Arg Lys Cys
 65                 70                  75                  80

Gln Lys Arg Pro Cys Gly His Pro Gly Asp Thr Pro Phe Gly Thr Phe
                    85                  90                  95

Thr Leu Thr Gly Gly Asn Val Phe Glu Tyr Gly Val Lys Ala Val Tyr
                   100                 105                 110

Thr Cys Asn Glu Gly Tyr Gln Leu Leu Gly Glu Ile Asn Tyr Arg Glu
                   115                 120                 125

Cys Asp Thr Asp Gly Trp Thr Asn Asp Ile Pro Ile Cys Glu Val Val
                   130                 135                 140

Lys Cys Leu Pro Val Thr Ala Pro Glu Asn Gly Lys Ile Val Ser Ser
145                 150                 155                 160

Ala Met Glu Pro Asp Arg Glu Tyr His Phe Gly Gln Ala Val Arg Phe
                   165                 170                 175

Val Cys Asn Ser Gly Tyr Lys Ile Glu Gly Asp Glu Glu Met His Cys
                   180                 185                 190

Ser Asp Asp Gly Phe Trp Ser Lys Glu Lys Pro Lys Cys Val Glu Ile
                   195                 200                 205

Ser Cys Lys Ser Pro Asp Val Ile Asn Gly Ser Pro Ile Ser Gln Lys
                   210                 215                 220

Ile Ile Tyr Lys Glu Asn Glu Arg Phe Gln Tyr Lys Cys Asn Met Gly
225                 230                 235                 240

Tyr Glu Tyr Ser Glu Arg Gly Asp Ala Val Cys Thr Glu Ser Gly Trp
                   245                 250                 255

Arg Pro Leu Pro Ser Cys Glu Glu Lys Ser Cys Asp Asn Pro Tyr Ile
                   260                 265                 270
```

-continued

```
Pro Asn Gly Asp Tyr Ser Pro Leu Arg Ile Lys His Arg Thr Gly Asp
            275                 280                 285
Glu Ile Thr Tyr Gln Cys Arg Asn Gly Phe Tyr Pro Ala Thr Arg Gly
        290                 295                 300
Asn Thr Ala Lys Cys Thr Ser Thr Gly Trp Ile Pro Ala Pro Arg Cys
305                 310                 315                 320
Thr Leu Lys Pro Cys Asp Tyr Pro Asp Ile Lys His Gly Gly Leu Tyr
                325                 330                 335
His Glu Asn Met Arg Arg Pro Tyr Phe Pro Val Ala Val Gly Lys Tyr
            340                 345                 350
Tyr Ser Tyr Tyr Cys Asp Glu His Phe Glu Thr Pro Ser Gly Ser Tyr
        355                 360                 365
Trp Asp His Ile His Cys Thr Gln Asp Gly Trp Ser Pro Ala Val Pro
370                 375                 380
Cys Leu Arg Lys Cys Tyr Phe Pro Tyr Leu Glu Asn Gly Tyr Asn Gln
385                 390                 395                 400
Asn Tyr Gly Arg Lys Phe Val Gln Gly Lys Ser Ile Asp Val Ala Cys
                405                 410                 415
His Pro Gly Tyr Ala Leu Pro Lys Ala Gln Thr Thr Val Thr Cys Met
            420                 425                 430
Glu Asn Gly Trp Ser Pro Thr Pro Arg Cys Ile Arg Val Lys Thr Cys
        435                 440                 445
Ser Lys Ser Ser Ile Asp Ile Glu Asn Gly Phe Ile Ser Glu Ser Gln
    450                 455                 460
Tyr Thr Tyr Ala Leu Lys Glu Lys Ala Lys Tyr Gln Cys Lys Leu Gly
465                 470                 475                 480
Tyr Val Thr Ala Asp Gly Glu Thr Ser Gly Ser Ile Thr Cys Gly Lys
                485                 490                 495
Asp Gly Trp Ser Ala Gln Pro Thr Cys Ile Lys Ser Cys Asp Ile Pro
            500                 505                 510
Val Phe Met Asn Ala Arg Thr Lys Asn Asp Phe Thr Trp Phe Lys Leu
        515                 520                 525
Asn Asp Thr Leu Asp Tyr Glu Cys His Asp Gly Tyr Glu Ser Asn Thr
530                 535                 540
Gly Ser Thr Thr Gly Ser Ile Val Cys Gly Tyr Asn Gly Trp Ser Asp
545                 550                 555                 560
Leu Pro Ile Cys Tyr Glu Arg Glu Cys Glu Leu Pro Lys Ile Asp Val
                565                 570                 575
His Leu Val Pro Asp Arg Lys Lys Asp Gln Tyr Lys Val Gly Glu Val
            580                 585                 590
Leu Lys Phe Ser Cys Lys Pro Gly Phe Thr Ile Val Gly Pro Asn Ser
        595                 600                 605
Val Gln Cys Tyr His Phe Gly Leu Ser Pro Asp Leu Pro Ile Cys Lys
610                 615                 620
Glu Gln Val Gln Ser Cys Gly Pro Pro Glu Leu Leu Asn Gly Asn
625                 630                 635                 640
Val Lys Glu Lys Thr Lys Glu Glu Tyr Gly His Ser Glu Val Val Glu
                645                 650                 655
Tyr Tyr Cys Asn Pro Arg Phe Leu Met Lys Gly Pro Asn Lys Ile Gln
            660                 665                 670
Cys Val Asp Gly Glu Trp Thr Thr Leu Pro Val Cys Ile Val Glu Glu
        675                 680                 685
Ser Thr Cys Gly Asp Ile Pro Glu Leu Glu His Gly Trp Ala Gln Leu
```

```
              690             695             700
Ser Ser Pro Tyr Tyr Tyr Gly Asp Ser Val Glu Phe Asn Cys Ser
705             710             715             720

Glu Ser Phe Thr Met Ile Gly His Arg Ser Ile Thr Cys Ile His Gly
            725             730             735

Val Trp Thr Gln Leu Pro Gln Cys Val Ala Ile Asp Lys Leu Lys Lys
            740             745             750

Cys Lys Ser Ser Asn Leu Ile Ile Leu Glu Glu His Leu Lys Asn Lys
            755             760             765

Lys Glu Phe Asp His Asn Ser Asn Ile Arg Tyr Arg Cys Arg Gly Lys
            770             775             780

Glu Gly Trp Ile His Thr Val Cys Ile Asn Gly Arg Trp Asp Pro Glu
785             790             795             800

Val Asn Cys Ser Met Ala Gln Ile Gln Leu Cys Pro Pro Pro Pro Gln
            805             810             815

Ile Pro Asn Ser His Asn Met Thr Thr Thr Leu Asn Tyr Arg Asp Gly
            820             825             830

Glu Lys Val Ser Val Leu Cys Gln Glu Asn Tyr Leu Ile Gln Glu Gly
            835             840             845

Glu Glu Ile Thr Cys Lys Asp Gly Arg Trp Gln Ser Ile Pro Leu Cys
            850             855             860

Val Glu Lys Ile Pro Cys Ser Gln Pro Pro Gln Ile Glu His Gly Thr
865             870             875             880

Ile Asn Ser Ser Arg Ser Ser Gln Glu Ser Tyr Ala His Gly Thr Lys
            885             890             895

Leu Ser Tyr Thr Cys Glu Gly Gly Phe Arg Ile Ser Glu Glu Asn Glu
            900             905             910

Thr Thr Cys Tyr Met Gly Lys Trp Ser Ser Pro Pro Gln Cys Glu Gly
            915             920             925

Leu Pro Cys Lys Ser Pro Pro Glu Ile Ser His Gly Val Val Ala His
            930             935             940

Met Ser Asp Ser Tyr Gln Tyr Gly Glu Glu Val Thr Tyr Lys Cys Phe
945             950             955             960

Glu Gly Phe Gly Ile Asp Gly Pro Ala Ile Ala Lys Cys Leu Gly Glu
            965             970             975

Lys Trp Ser His Pro Pro Ser Cys Ile Lys Thr Asp Cys Leu Ser Leu
            980             985             990

Pro Ser Phe Glu Asn Ala Ile Pro Met Gly Glu Lys Lys Asp Val Tyr
            995             1000            1005

Lys Ala Gly Glu Gln Val Thr Tyr Thr Cys Ala Thr Tyr Tyr Lys
            1010            1015            1020

Met Asp Gly Ala Ser Asn Val Thr Cys Ile Asn Ser Arg Trp Thr
            1025            1030            1035

Gly Arg Pro Thr Cys Arg Asp Thr Ser Cys Val Asn Pro Pro Thr
            1040            1045            1050

Val Gln Asn Ala Tyr Ile Val Ser Arg Gln Met Ser Lys Tyr Pro
            1055            1060            1065

Ser Gly Glu Arg Val Arg Tyr Gln Cys Arg Ser Pro Tyr Glu Met
            1070            1075            1080

Phe Gly Asp Glu Glu Val Met Cys Leu Asn Gly Asn Trp Thr Glu
            1085            1090            1095

Pro Pro Gln Cys Lys Asp Ser Thr Gly Lys Cys Gly Pro Pro Pro
            1100            1105            1110
```

```
Pro Ile Asp Asn Gly Asp Ile Thr Ser Phe Pro Leu Ser Val Tyr
    1115            1120                1125

Ala Pro Ala Ser Ser Val Glu Tyr Gln Cys Gln Asn Leu Tyr Gln
    1130            1135                1140

Leu Glu Gly Asn Lys Arg Ile Thr Cys Arg Asn Gly Gln Trp Ser
    1145            1150                1155

Glu Pro Pro Lys Cys Leu His Pro Cys Val Ile Ser Arg Glu Ile
    1160            1165                1170

Met Glu Asn Tyr Asn Ile Ala Leu Arg Trp Thr Ala Lys Gln Lys
    1175            1180                1185

Leu Tyr Ser Arg Thr Gly Glu Ser Val Glu Phe Val Cys Lys Arg
    1190            1195                1200

Gly Tyr Arg Leu Ser Ser Arg Ser His Thr Leu Arg Thr Thr Cys
    1205            1210                1215

Trp Asp Gly Lys Leu Glu Tyr Pro Thr Cys Ala Lys Arg
    1220            1225                1230

<210> SEQ ID NO 3
<211> LENGTH: 9
<212> TYPE: PRT
<213> ORGANISM: Artificial sequence
<220> FEATURE:
<223> OTHER INFORMATION: synthetic sequence

<400> SEQUENCE: 3

Tyr Pro Tyr Asp Val Pro Asp Tyr Ala
1               5

<210> SEQ ID NO 4
<211> LENGTH: 8
<212> TYPE: PRT
<213> ORGANISM: Artificial sequence
<220> FEATURE:
<223> OTHER INFORMATION: synthetic sequence

<400> SEQUENCE: 4

Asp Tyr Lys Asp Asp Asp Asp Lys
1               5

<210> SEQ ID NO 5
<211> LENGTH: 10
<212> TYPE: PRT
<213> ORGANISM: Artificial sequence
<220> FEATURE:
<223> OTHER INFORMATION: synthetic sequence

<400> SEQUENCE: 5

Glu Gln Lys Leu Ile Ser Glu Glu Asp Leu
1               5                   10
```